US012674904B2

(12) United States Patent
Kumar et al.

(10) Patent No.: US 12,674,904 B2
(45) Date of Patent: Jul. 7, 2026

(54) SYSTEMS AND METHODS FOR SCALING AND THRESHOLDING PARAMETRIZATION OF SHEAR NOISE ATTENUATION

(71) Applicant: Schlumberger Technology Corporation, Sugar Land, TX (US)

(72) Inventors: Rajiv Kumar, Crawley (GB); Claudio Bagaini, Crawley (GB); Massimiliano Vassallo, Crawley (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 116 days.

(21) Appl. No.: 18/626,614

(22) Filed: Apr. 4, 2024

(65) Prior Publication Data

US 2025/0314792 A1     Oct. 9, 2025

(51) Int. Cl.
G01V 1/36          (2006.01)

(52) U.S. Cl.
CPC ........ G01V 1/364 (2013.01); *G01V 2210/324* (2013.01)

(58) Field of Classification Search
None
See application file for complete search history.

(56) References Cited

U.S. PATENT DOCUMENTS

| | | | | |
|---|---|---|---|---|
| 6,005,916 A * | 12/1999 | Johnson | ................ | G06T 11/006 600/425 |
| 9,651,696 B2 * | 5/2017 | Peng | ........................ | G01V 1/28 |
| 10,224,900 B2 * | 3/2019 | Poole | ..................... | G01V 20/00 |
| 11,796,699 B2 * | 10/2023 | Hammad | ............... | G01V 1/284 |
| 2007/0282200 A1 * | 12/2007 | Johnson | ................. | G01N 22/00 600/407 |

(Continued)

FOREIGN PATENT DOCUMENTS

WO     WO-2024191803 A1 *   9/2024   ............. G01V 1/364

OTHER PUBLICATIONS

Laws, Robert, and Ed Kragh. "Rough seas and time-lapse seismic." Geophysical Prospecting 50.2 (2002): 195-208. (Year: 2002).*

(Continued)

*Primary Examiner* — Jonathan D Armstrong
(74) *Attorney, Agent, or Firm* — Kyle R. Miiller

(57)          ABSTRACT

Disclosed is a method comprising: receiving captured seismic data and generating first velocity and first pressure data therefrom; transforming, from a first data domain to a second data domain, the first velocity and first pressure data and thereby generate second velocity and second pressure data; mapping wavenumber gather data from the second data domain to a third data domain; determining envelope ratio scaling data and threshold value data using the second velocity and second pressure data; generating, threshold envelope data using a thresholding operator associated with the threshold value data; using coefficient data associated with the threshold envelope data to estimate vertical component data; transforming, from the third data domain to the first data domain, the vertical component data to generate temporal-spatial data; and generating, based on the temporal-spatial data, noise component data comprised in the captured seismic data.

17 Claims, 10 Drawing Sheets

(56)     References Cited

U.S. PATENT DOCUMENTS

| | | | | |
|---|---|---|---|---|
| 2008/0221801 A1* | 9/2008 | Craft | G01V 1/364 | 702/17 |
| 2011/0213556 A1* | 9/2011 | Yu | G01V 1/368 | 702/14 |
| 2013/0021873 A1* | 1/2013 | Mattocks | G01V 1/36 | 367/24 |
| 2013/0163377 A1* | 6/2013 | Poole | G01V 1/368 | 367/24 |
| 2013/0163378 A1* | 6/2013 | Poole | G01V 1/36 | 367/24 |
| 2014/0200818 A1* | 7/2014 | Peng | G01V 1/364 | 702/17 |
| 2014/0310433 A1* | 10/2014 | Preusser | H04W 4/38 | 710/12 |
| 2014/0340987 A1* | 11/2014 | Kluver | G01V 1/32 | 367/21 |
| 2014/0365135 A1* | 12/2014 | Poole | G01V 1/36 | 702/17 |
| 2015/0236668 A1* | 8/2015 | Poole | H03H 17/0248 | 703/2 |
| 2016/0245942 A1* | 8/2016 | Poole | G01V 1/32 | |
| 2016/0327670 A1* | 11/2016 | Wang | G01V 1/362 | |
| 2017/0031045 A1* | 2/2017 | Poole | G01V 1/282 | |
| 2018/0196154 A1* | 7/2018 | Gomes | G01V 1/282 | |
| 2020/0292724 A1* | 9/2020 | Boiero | G01V 1/306 | |
| 2023/0065746 A1* | 3/2023 | Hammad | G01V 1/42 | |
| 2024/0288381 A1* | 8/2024 | Stowell | H01Q 13/20 | |

OTHER PUBLICATIONS

Górszczyk, Andrzej, Anna Adamczyk, and Michał Malinowski. "Application of curvelet denoising to 2D and 3D seismic data—Practical considerations." Journal of Applied Geophysics 105 (2014): 78-94. (Year: 2014).*

Wang, Guxi, et al. "Application of a new wavelet threshold method in unconventional oil and gas reservoir seismic data denoising." Mathematical Problems in Engineering 2015.1 (2015): 969702. (Year: 2015).*

Liu, Hui, et al. "A de-noising method using the improved wavelet threshold function based on noise variance estimation." Mechanical Systems and Signal Processing 99 (2018): 30-46. (Year: 2018).*

Zhou, Xiawan, et al. "Applying wavelet transform to suppress ghost in ocean-bottom node dual-sensor technology." Marine Geophysical Research 43.1 (2022): 5. (Year: 2022).*

Tang, Shuhang. "Reconstruction of sparsely sampled seismic data via residual u-net and earthquake stress drop for a circular crack in an anisotropic medium." (2021). (Year: 2021).*

Paffenholz, J. et al., "Shear Wave Noise on OBS Vz Data—Part I Evidence from Field Data", European Association of Geoscientists & Engineers, 68th EAGE Conference and Exhibition incorporating SPE EUROPEC 2006, Jun. 2006.

Paffenholz, J. et al., Shear Wave Noise on OBS Vz Data—Part II Elastic Modeling of Scatterers in the Seabed, 68th EAGE Conference and Exhibition incorporating SPE EUROPEC 2006, 2006.

Craft, K.L. et al., "Geophone Noise Attenuation and Wavefield Separation Using a Multidimensional Decomposition Technique", SEG Technical Program Expanded Abstracts, Jan. 2007, vol. 26, No. 1.

Ren, Y. et al., "Vz Denoise and P/Z Matching in 3d Curvelet Domain", Paper presented at the SEG/AAPG International Meeting for Applied Geoscience & Energy, Nov. 1, 2022, pp. 2862-2866.

Yang, C. et al., "Shear Wave Noise Attenuation and Wavefield Separation in Curvelet Domain", SEG Technical Program Expanded Abstracts, 2020, pp. 1805-1809.

Candès, E. et al., "Fast Discrete Curvelet Transforms", SIAM Journal on Multiscale Modeling and Simulation, Jul. 2005, pp. 1-43, vol. 5, No. 3.

Chang, S.G. et al., "Adaptive Wavelet Thresholding for Image Denoising and Compression", IEEE Transactions on Image Processing, Sep. 2000, pp. 1532-1546, vol. 9, No. 9.

Yang, P. et al., "Seislet-Based Morphological Component Analysis Using Scale-Dependent Exponential Shrinkage", Journal of Applied Geophysics, Jul. 2015, pp. 1-18, vol. 118.

Ren, Y. et al., "Vz Noise Attenuation Using Dual-Tree Complex Wavelet Transform", SEG Technical Program Expanded Abstracts, 2020, pp. 1830-1834.

* cited by examiner

Figure 1:
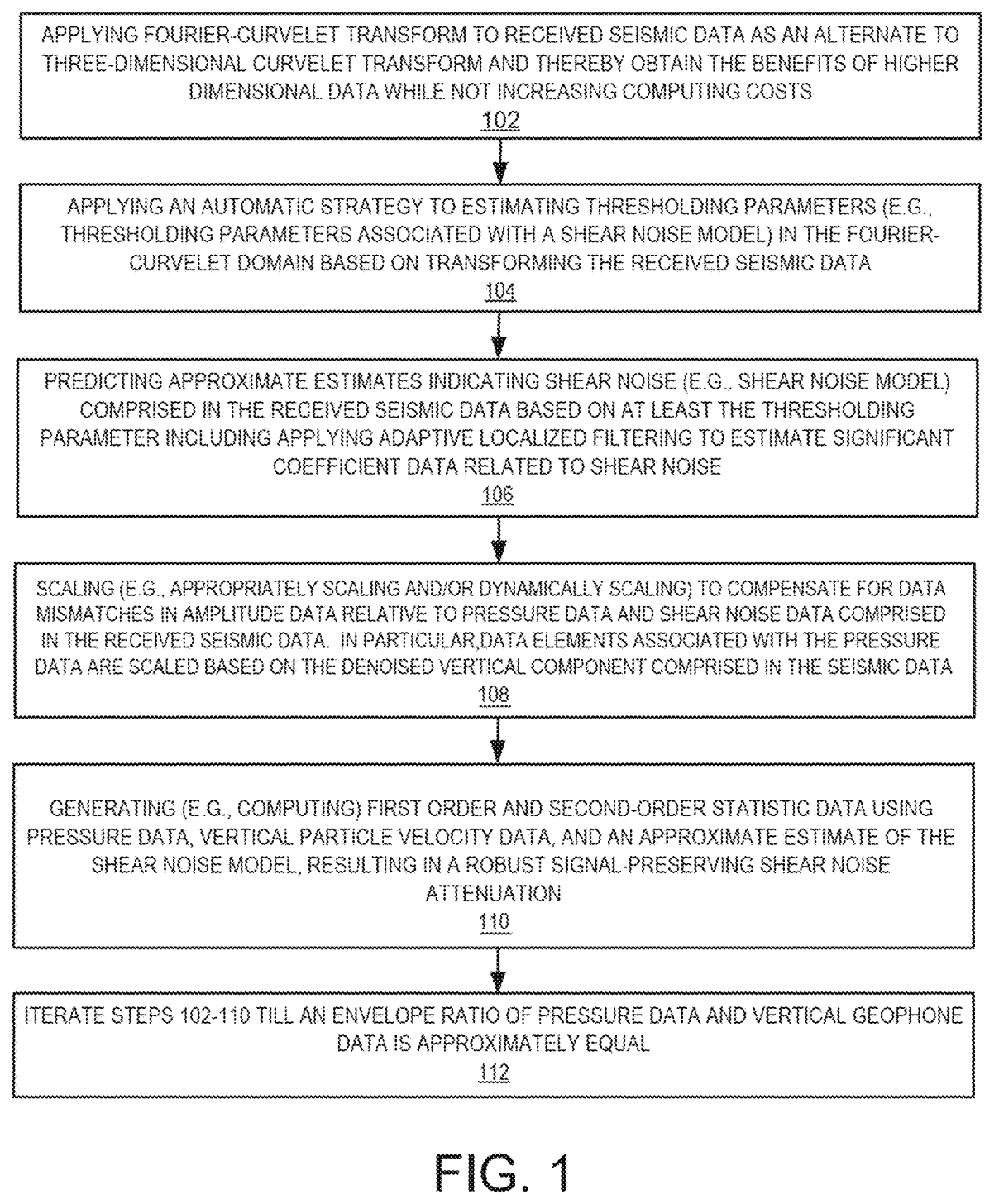

APPLYING FOURIER-CURVELET TRANSFORM TO RECEIVED SEISMIC DATA AS AN ALTERNATE TO
THREE-DIMENSIONAL CURVELET TRANSFORM AND THEREBY OBTAIN THE BENEFITS OF HIGHER
DIMENSIONAL DATA WHILE NOT INCREASING COMPUTING COSTS
102

APPLYING AN AUTOMATIC STRATEGY TO ESTIMATING THRESHOLDING PARAMETERS (E.G.,
THRESHOLDING PARAMETERS ASSOCIATED WITH A SHEAR NOISE MODEL) IN THE FOURIER-
CURVELET DOMAIN BASED ON TRANSFORMING THE RECEIVED SEISMIC DATA
104

PREDICTING APPROXIMATE ESTIMATES INDICATING SHEAR NOISE (E.G., SHEAR NOISE MODEL)
COMPRISED IN THE RECEIVED SEISMIC DATA BASED ON AT LEAST THE THRESHOLDING
PARAMETER INCLUDING APPLYING ADAPTIVE LOCALIZED FILTERING TO ESTIMATE SIGNIFICANT
COEFFICIENT DATA RELATED TO SHEAR NOISE
106

SCALING (E.G., APPROPRIATELY SCALING AND/OR DYNAMICALLY SCALING) TO COMPENSATE FOR DATA
MISMATCHES IN AMPLITUDE DATA RELATIVE TO PRESSURE DATA AND SHEAR NOISE DATA COMPRISED
IN THE RECEIVED SEISMIC DATA. IN PARTICULAR, DATA ELEMENTS ASSOCIATED WITH THE PRESSURE
DATA ARE SCALED BASED ON THE DENOISED VERTICAL COMPONENT COMPRISED IN THE SEISMIC DATA
108

GENERATING (E.G., COMPUTING) FIRST ORDER AND SECOND-ORDER STATISTIC DATA USING
PRESSURE DATA, VERTICAL PARTICLE VELOCITY DATA, AND AN APPROXIMATE ESTIMATE OF THE
SHEAR NOISE MODEL, RESULTING IN A ROBUST SIGNAL-PRESERVING SHEAR NOISE
ATTENUATION
110

ITERATE STEPS 102-110 TILL AN ENVELOPE RATIO OF PRESSURE DATA AND VERTICAL GEOPHONE
DATA IS APPROXIMATELY EQUAL
112

Figure 9A:
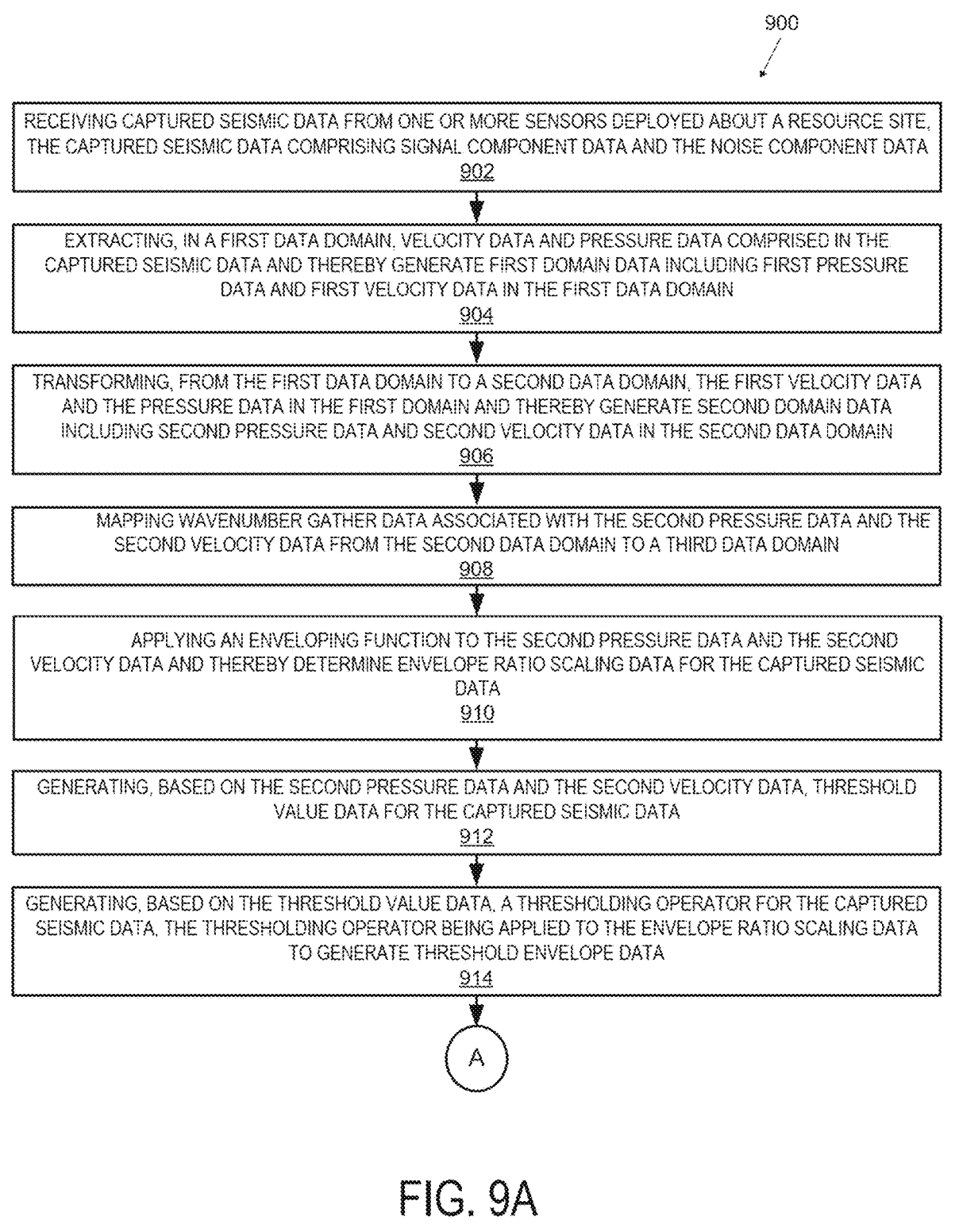

RECEIVING CAPTURED SEISMIC DATA FROM ONE OR MORE SENSORS DEPLOYED ABOUT A RESOURCE SITE, THE CAPTURED SEISMIC DATA COMPRISING SIGNAL COMPONENT DATA AND THE NOISE COMPONENT DATA
902

EXTRACTING, IN A FIRST DATA DOMAIN, VELOCITY DATA AND PRESSURE DATA COMPRISED IN THE CAPTURED SEISMIC DATA AND THEREBY GENERATE FIRST DOMAIN DATA INCLUDING FIRST PRESSURE DATA AND FIRST VELOCITY DATA IN THE FIRST DATA DOMAIN
904

TRANSFORMING, FROM THE FIRST DATA DOMAIN TO A SECOND DATA DOMAIN, THE FIRST VELOCITY DATA AND THE PRESSURE DATA IN THE FIRST DOMAIN AND THEREBY GENERATE SECOND DOMAIN DATA INCLUDING SECOND PRESSURE DATA AND SECOND VELOCITY DATA IN THE SECOND DATA DOMAIN
906

MAPPING WAVENUMBER GATHER DATA ASSOCIATED WITH THE SECOND PRESSURE DATA AND THE SECOND VELOCITY DATA FROM THE SECOND DATA DOMAIN TO A THIRD DATA DOMAIN
908

APPLYING AN ENVELOPING FUNCTION TO THE SECOND PRESSURE DATA AND THE SECOND VELOCITY DATA AND THEREBY DETERMINE ENVELOPE RATIO SCALING DATA FOR THE CAPTURED SEISMIC DATA
910

GENERATING, BASED ON THE SECOND PRESSURE DATA AND THE SECOND VELOCITY DATA, THRESHOLD VALUE DATA FOR THE CAPTURED SEISMIC DATA
912

GENERATING, BASED ON THE THRESHOLD VALUE DATA, A THRESHOLDING OPERATOR FOR THE CAPTURED SEISMIC DATA, THE THRESHOLDING OPERATOR BEING APPLIED TO THE ENVELOPE RATIO SCALING DATA TO GENERATE THRESHOLD ENVELOPE DATA
914

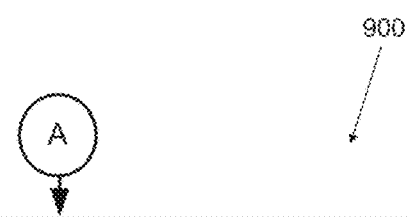

900

APPLYING ADAPTIVE LOCALIZED FILTERING TO THE THRESHOLD ENVELOPE DATA TO GENERATE COEFFICIENT DATA FOR THE CAPTURED SEISMIC DATA
916

ESTIMATING, BASED ON THE COEFFICIENT DATA FOR THE CAPTURED SEISMIC DATA, VERTICAL COMPONENT DATA FOR THE SECOND VELOCITY DATA IN THE THIRD DATA DOMAIN
918

TRANSFORMING, FROM THE THIRD DATA DOMAIN TO THE FIRST DATA DOMAIN, THE VERTICAL COMPONENT DATA AND THEREBY GENERATE TEMPORAL-SPATIAL DATA ASSOCIATED WITH THE FIRST VELOCITY DATA
920

GENERATING, BASED ON THE TEMPORAL-SPATIAL DATA, THE NOISE COMPONENT DATA COMPRISED IN THE CAPTURED SEISMIC DATA BY SUBTRACTING THE TEMPORAL-SPATIAL DATA FROM THE PRESSURE DATA
922

ESTIMATING, IN A FIRST ITERATION, THE SIGNAL COMPONENT DATA IN THE SECOND DATA DOMAIN BASED ON THE NOISE COMPONENT DATA, THE PRESSURE DATA, AND THE VERTICAL COMPONENT DATA AND THEREBY GENERATE AN ESTIMATED SIGNAL COMPONENT DATA
924

GENERATING A MULTI-DIMENSIONAL REPORT INDICATING THE ESTIMATED SIGNAL COMPONENT DATA IN THE FIRST DOMAIN, THE MULTI-DIMENSIONAL REPORT INDICATING THE CAPTURED SEISMIC DATA WITH ONE OF: NO DATA VALUES CORRESPONDING TO THE NOISE COMPONENT DATA, OR SUBSTANTIALLY ATTENUATED DATA VALUES OF THE NOISE COMPONENT DATA
926

FIG. 9B

SYSTEMS AND METHODS FOR SCALING AND THRESHOLDING PARAMETRIZATION OF SHEAR NOISE ATTENUATION

BACKGROUND

Inconsistent coupling in onshore and offshore multicomponent acquisition comprises a phenomenon that is referred to as vector infidelity. Shear noise on vertical velocity component data associated with received seismic data may be considered as vector infidelity data. According to one embodiment, shear noise comprised in the vertical component data may be removed before further processing the vertical component data using pressure data and/or particle velocity data acquired in an ocean bottom node environment.

A framework for attenuating shear noise data comprised in captured seismic data can involve using pressure envelope data as a prior to differentiate between signal component data and noise component data in the vertical component data associated with the captured seismic data within the Curvelet domain. The choice of Curvelet Transform may be in a 2-dimensional and/or a 3-dimensional Curvelet domain which is prohibitively expensive for large-scale seismic data. In some cases, the use of the Curvelet Transform involves the cumbersome work of defining thresholding values using significant testing to understand if the thresholding values are appropriate for removing shear noise. Moreover, the process of shear noise removal can result in the loss of weak coherent signals/data (e.g., comprised in the signal component) buried beneath strong shear noise component data.

SUMMARY

Disclosed are methods, systems, and computer program products that attenuate noise data comprised in captured seismic data. According to an embodiment, a method for attenuating noise data comprised in captured seismic data comprises: receiving captured seismic data from one or more sensors deployed about a resource site, the captured seismic data comprising signal component data and the noise component data; extracting, in a first data domain, velocity data and pressure data comprised in the captured seismic data and thereby generate first domain data including first pressure data and first velocity data in the first data domain; transforming, from the first data domain to a second data domain, the first velocity data and the pressure data in the first domain and thereby generate second domain data including second pressure data and second velocity data in the second data domain; mapping wavenumber gather data associated with the second pressure data and the second velocity data from the second data domain to a third data domain; applying an enveloping function to the second pressure data and the second velocity data and thereby determine envelope ratio scaling data for the captured seismic data; generating, based on the second pressure data and the second velocity data, threshold value data for the captured seismic data; and generating, based on the threshold value data, a thresholding operator for the captured seismic data, the thresholding operator being applied to the envelope ratio scaling data to generate threshold envelope data.

The method also comprises: applying adaptive localized filtering to the threshold envelope data to generate coefficient data for the captured seismic data; estimating, based on the coefficient data for the captured seismic data, vertical component data for the second velocity data in the third data domain; transforming, from the third data domain to the first data domain, the vertical component data and thereby generate temporal-spatial data associated with the first velocity data; and generating, based on the temporal-spatial data, the noise component data comprised in the captured seismic data by subtracting the temporal-spatial data from the pressure data.

The method can also comprise: estimating, in a first iteration, the signal component data in the second data domain based on the noise component data, the pressure data, and the vertical component data and thereby generate an estimated signal component data; and generating a multi-dimensional report indicating the estimated signal component data in the first domain. The multi-dimensional report, for example, can indicate the captured seismic data with one of: no data values corresponding to the noise component data; or substantially attenuated data values of the noise component data.

In other embodiments, a system and a computer program can include or execute the method described above. These and other implementations may each optionally include one or more of the following features.

In some embodiments, the noise component data comprises noise data including at least one of: random noise data; coherent noise data; or shear noise data resulting from propagation of shear waves in a subsurface of the resource site.

The first domain, according to some embodiments, comprises a 3-dimensional transform or a 5-dimensional transform. In addition, the first data domain can comprise a temporal spatial domain. Moreover, the second data domain can comprise a Fourier wavenumber domain. Furthermore, the third data domain can comprise a Curvelet domain.

According to some embodiments, estimating the signal component data in the second domain comprises applying a Bayesian weighting process using the noise component data, the pressure data, and the vertical component data and thereby generate the estimated signal component data.

In some implementations, scaling factor data is generated based on the estimated signal component data and the second pressure data. The scaling factor data can be applied to scale the second pressure data during a second iteration of generating the estimated signal component data.

It is appreciated that the resource site comprises an ocean bottom resource site.

It is further appreciated that the captured seismic data can be obtained using one or more of geophones, hydrophones, pressure sensors, signal acceleration sensors, or fiber optics sensors.

According to one embodiment, the report is used to create Green's function data characterizing a subsurface of the resource site. Furthermore, the report can be used for imaging or image inversion operations that characterize a subsurface at the resource site.

It is appreciated that the report can be used for at least one of: well placement operations at the resource site; equipment placement operations at the resource site; surgically locating a subsurface resource at the resource site; and configuring equipment associated with energy development at the resource site.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion.

FIG. 1 illustrates an exemplary high-level workflow for attenuating noise data comprised in captured seismic data.

Figure 2:
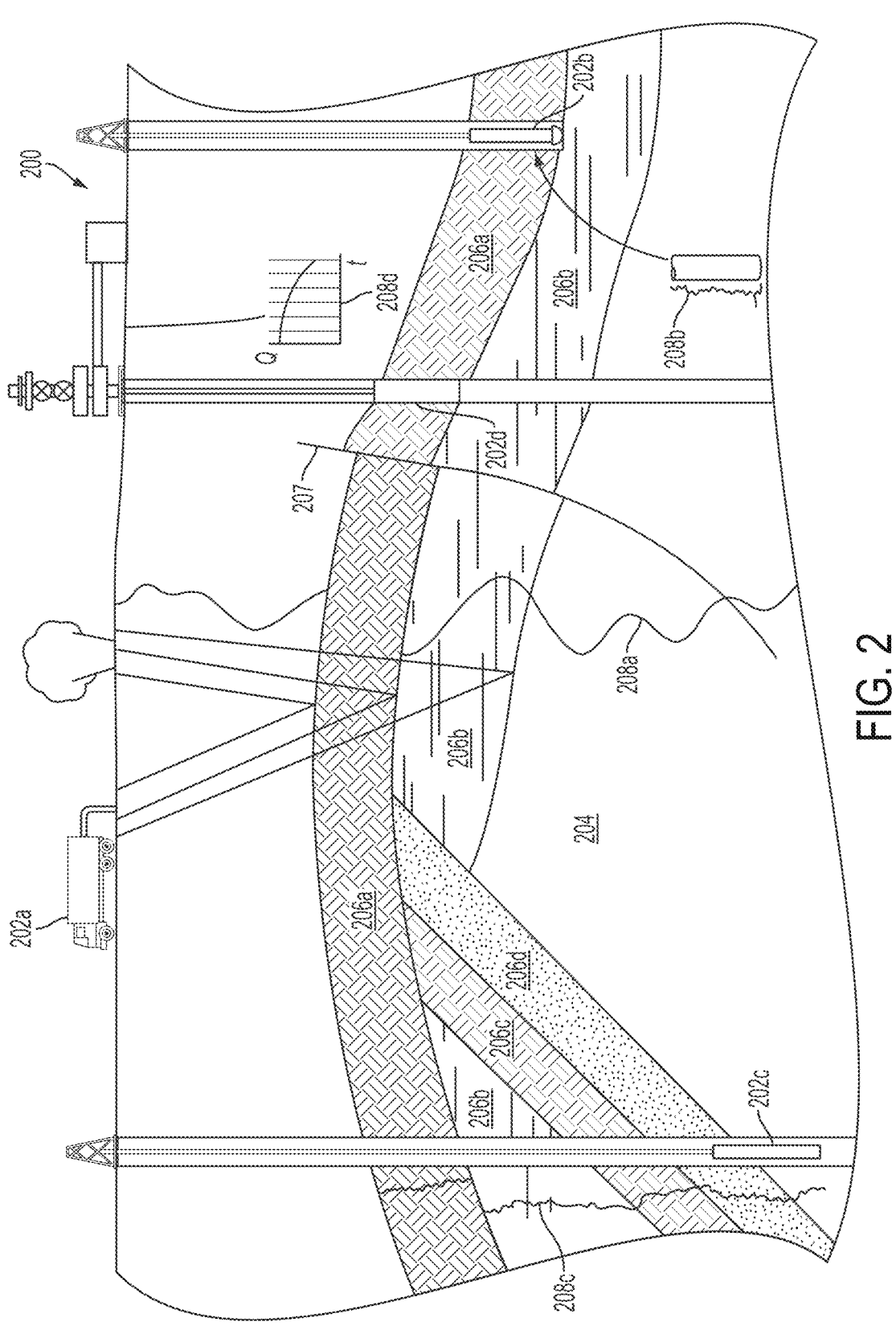
Figure 4:
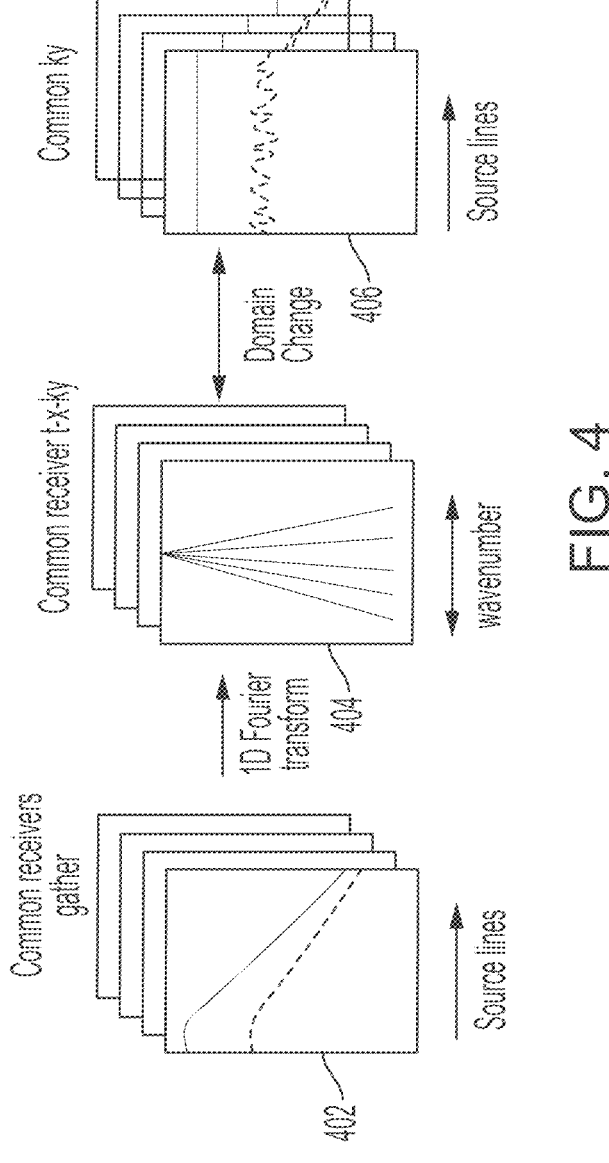

FIG. 2 depicts a cross-sectional view of a resource site for which the process of FIG. 4 may be executed.

Figure 3:
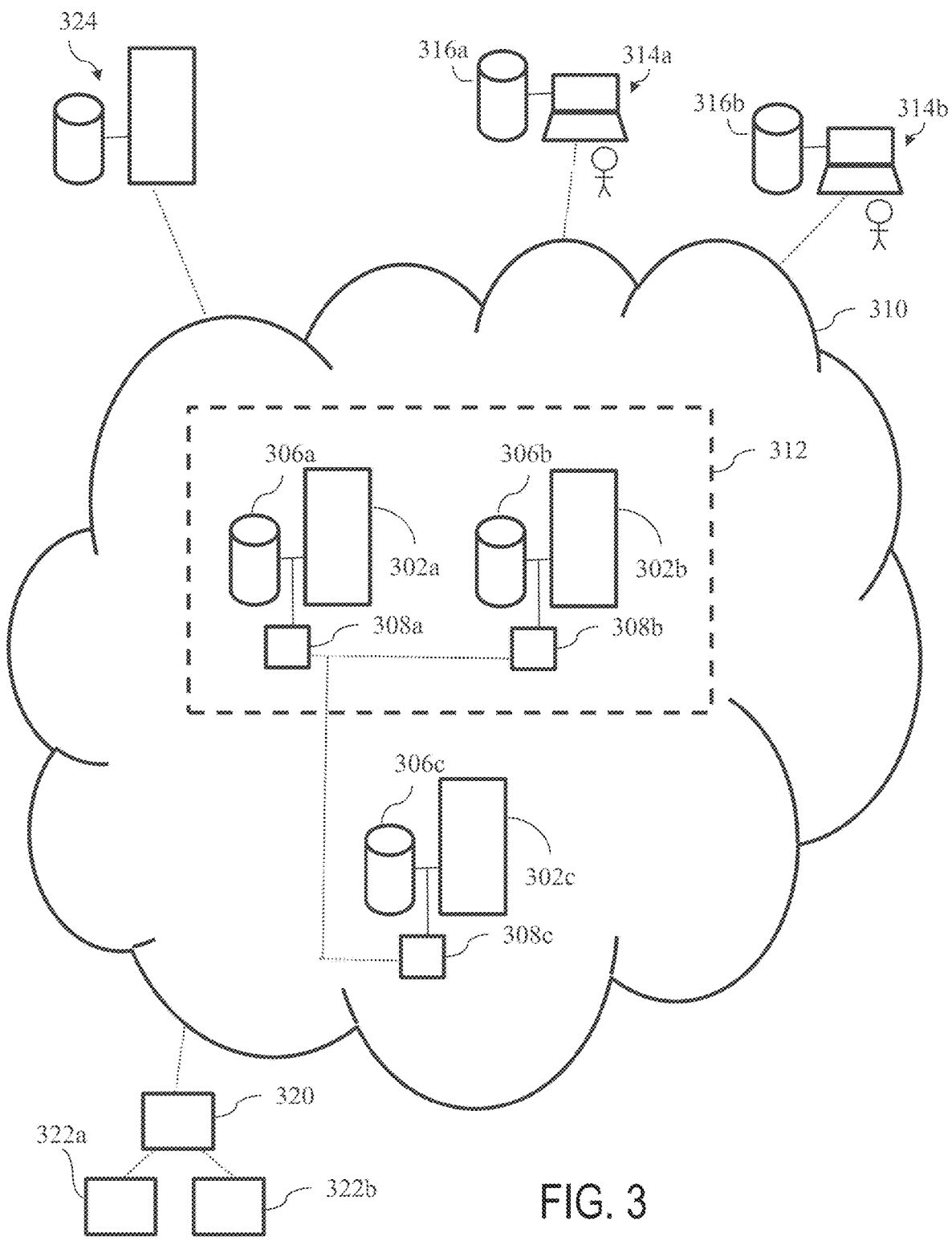

FIG. 3 depicts a networked system illustrating a communicative coupling of devices or systems associated with the resource site of FIG. 2.

FIG. 4 illustrates an exemplary process for projecting higher dimensional data into a lower-dimensional subspace representing a wavenumber domain.

Figure 5B:
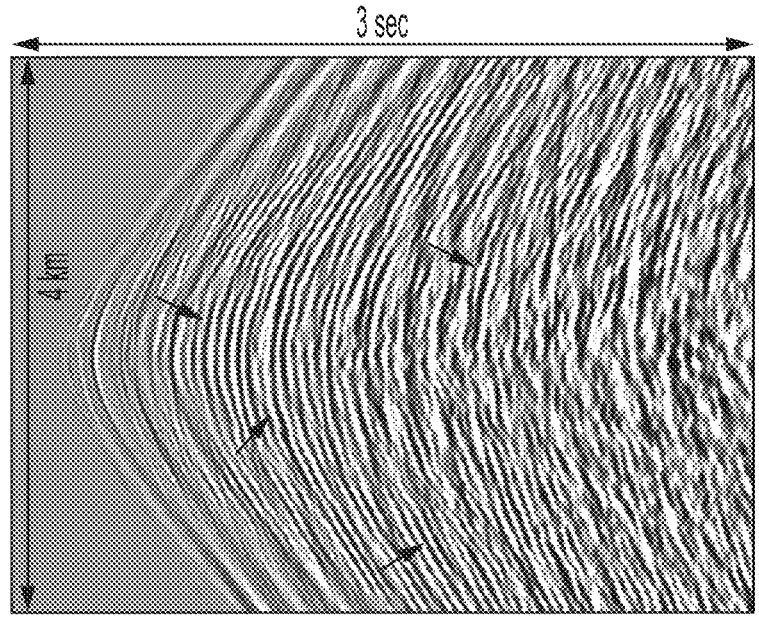
Figure 5A:
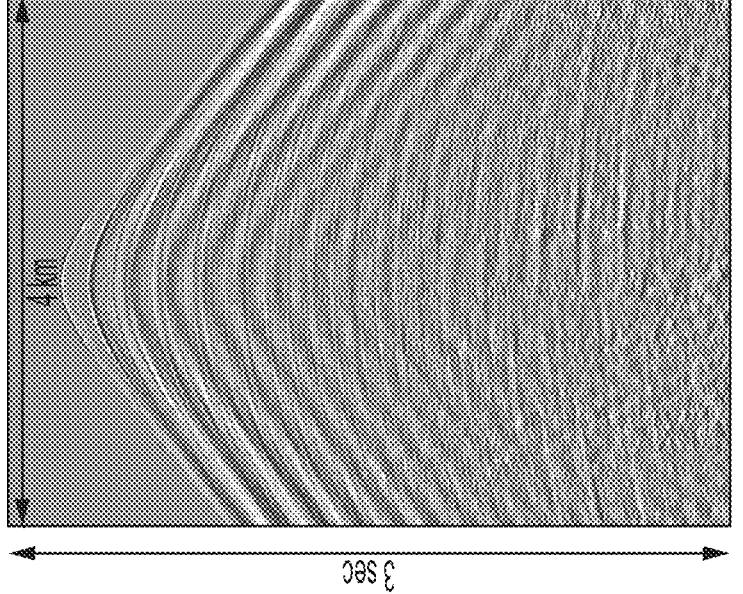

FIGS. 5A and 5B illustrates exemplary two-dimensional subsections extracted from a common receiver gather.

Figures 6A, 6B, 6C, 6D:
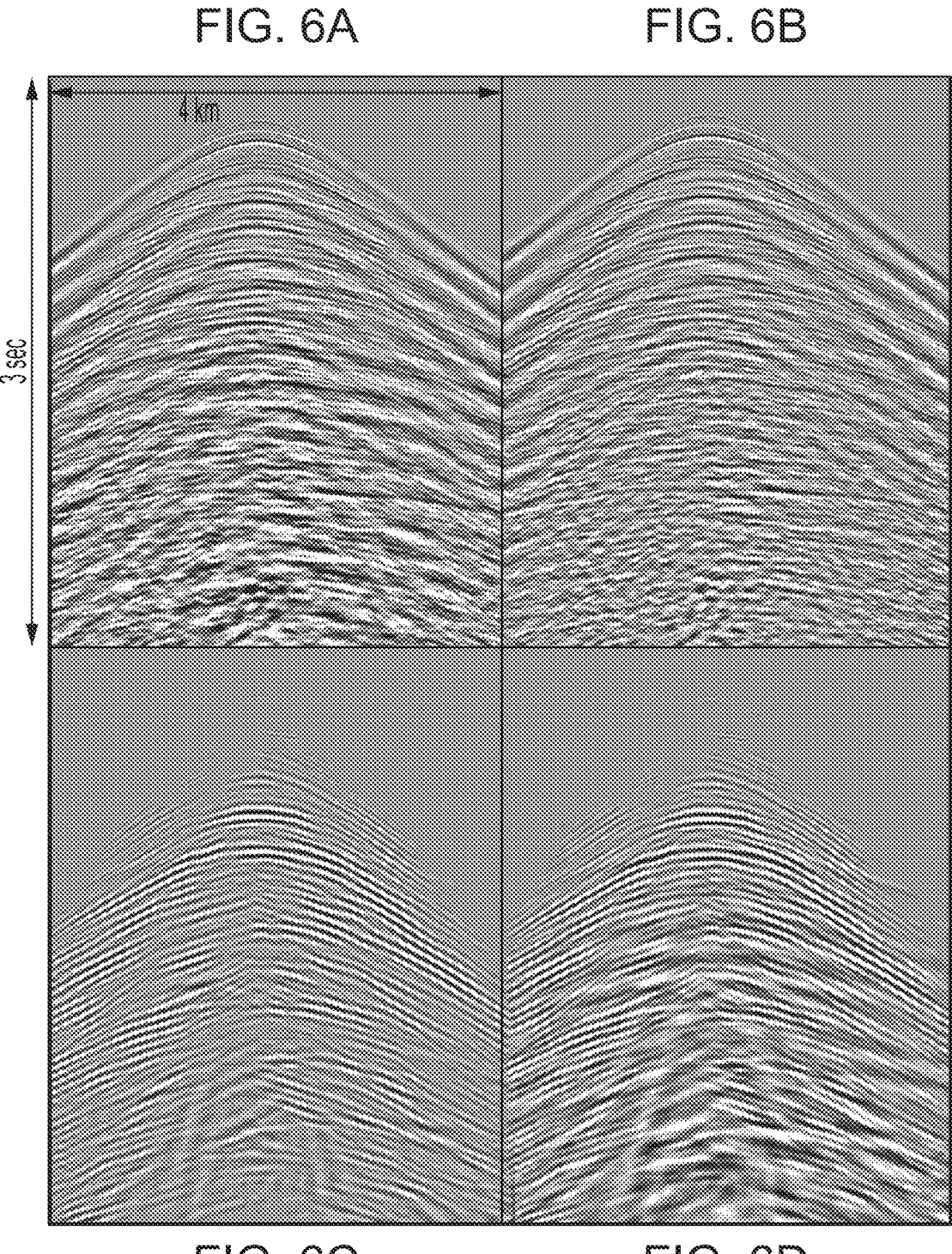

FIG. 6A illustrates an exemplary visualization indicating a two-dimensional Curvelet Transform that is generated based on noise attenuation along independent source lines of captured seismic data.

FIG. 6B illustrates an exemplary visualization indicating a Fourier-Curvelet domain that exploits the benefits of the higher dimension of captured seismic data.

FIG. 6C illustrates Fourier-Curvelet domain along with adaptive localized filtering of captured seismic data.

FIG. 6D illustrates an exemplary visualization generated from an iterative workflow involving Fourier-Curvelet domain, adaptive localized filtering, and optimum Bayesian weighting on captured seismic data.

Figures 7A, 7B, 7C, 7D:
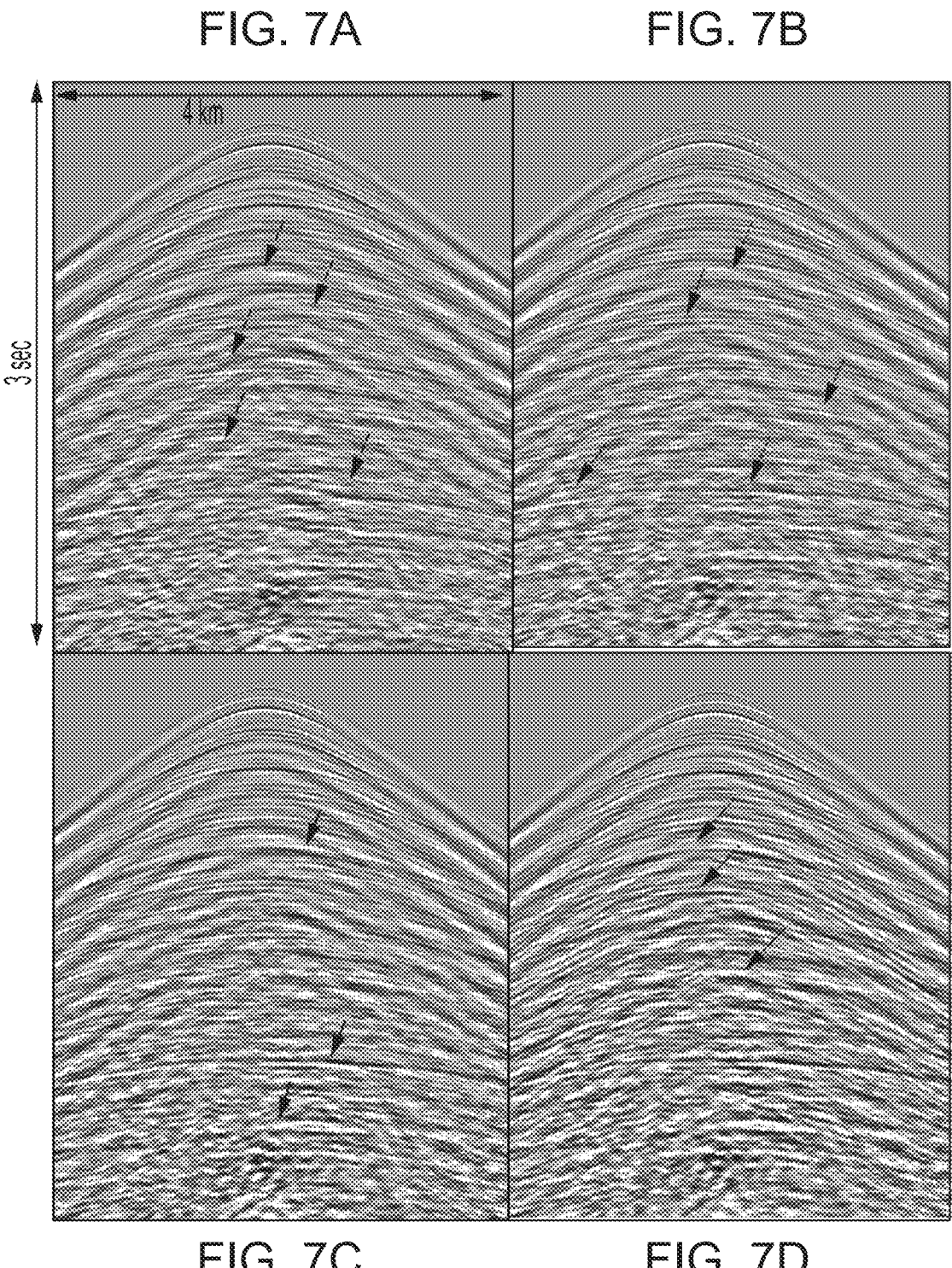

FIG. 7A illustrates an estimated signal model using a two-dimensional Curvelet Transform based approach where noise attenuation is performed along independent source lines.

FIG. 7B illustrates an estimated signal model using the Fourier-Curvelet domain to exploit the benefits of the higher dimension of the received seismic data.

FIG. 7C illustrates an estimated signal model using the Fourier-Curvelet domain along with adaptive localized filtering.

FIG. 7D illustrates an estimated signal model using an iterative workflow involving the Fourier-Curvelet domain, adaptive localized filtering, and optimum Bayesian weighting processes.

Figures 8A, 8B, 8C, 8D:
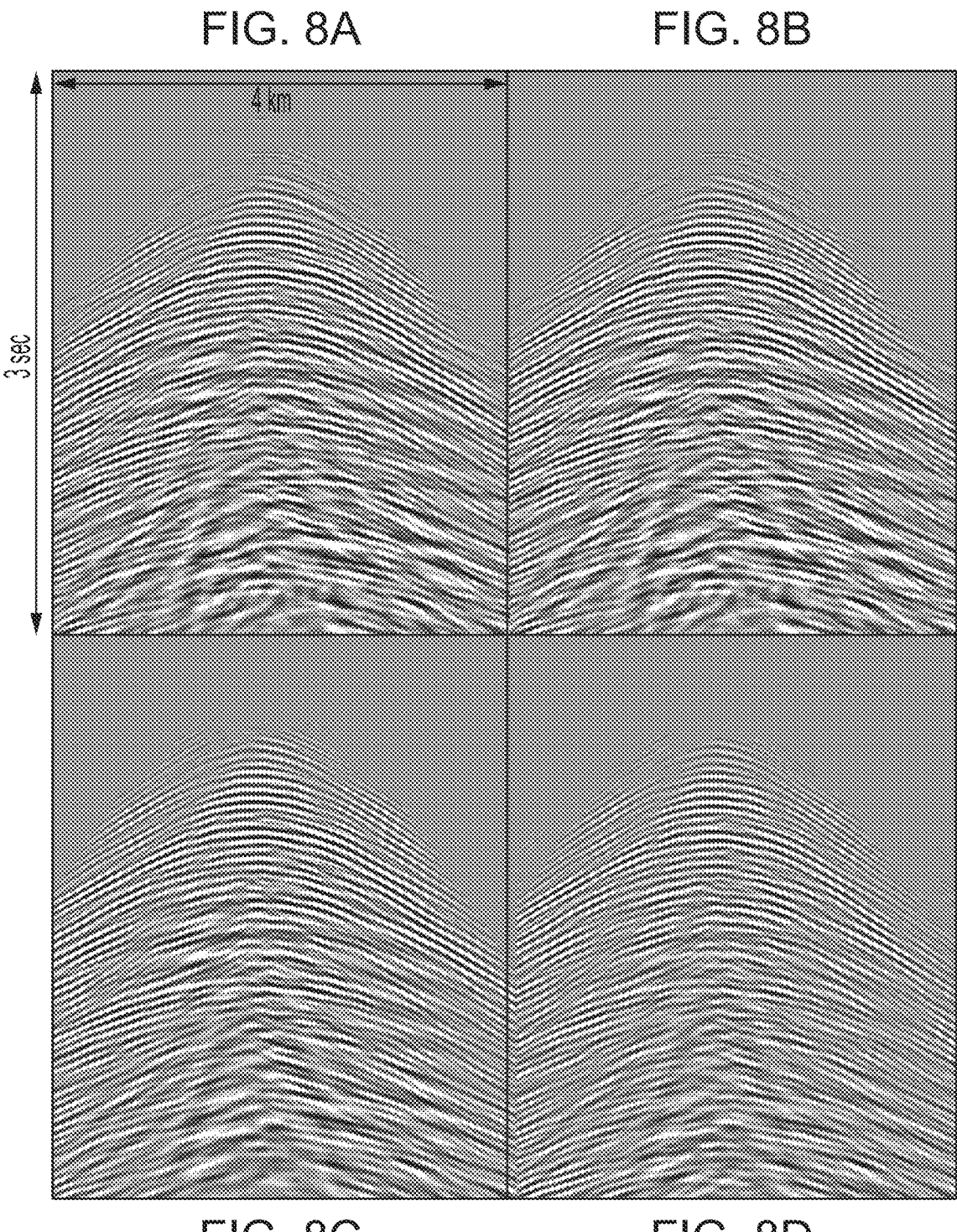

FIG. 8A illustrates an estimated shear noise model using a two-dimensional Curvelet Transform based approach where noise attenuation is performed along independent source lines.

FIG. 8B illustrates an estimated shear noise model using a Fourier-Curvelet domain to exploit the benefits of the higher dimension of the data.

FIG. 8C illustrates an estimated shear noise model using Fourier-Curvelet domain along with adaptive localized filtering.

FIG. 8D illustrates an estimated shear noise model using an iterative workflow involving the Fourier-Curvelet domain, adaptive localized filtering, and optimum Bayesian weighting.

FIGS. 9A and 9B illustrates an exemplary detailed workflow 900 for attenuating noise data comprised in captured seismic data.

DETAILED DESCRIPTION

Reference will now be made in detail to embodiments, examples of which are illustrated in the accompanying drawings and figures. In the following detailed description, numerous specific details are set forth in order to provide a thorough understanding of the disclosed subject-matter. However, it will be apparent to one of ordinary skill in the art that the solutions disclosed may be practiced without these specific details. In other instances, well-known methods, procedures, components, circuits, and networks have not been described in detail so as not to unnecessarily obscure aspects of the embodiments.

The disclosed systems and methods may be accomplished using interconnected devices and systems that obtain a plurality of data associated with various parameters of interest at a resource site. The workflows/flowcharts described in this disclosure, according to some embodiments, implicate a new processing approach (e.g., hardware, special purpose processors, and specially programmed general-purpose processors) because such analyses are too complex and cannot be done by a person in the time available or at all. Thus, the described systems and methods are directed to tangible implementations or solutions to specific technological problems in developing natural resources such as oil, gas, water well industries, and other mineral exploration operations. More specifically, the systems and methods presently disclosed may be applicable to operations associated with stratigraphic analysis associated with a resource site.

Attention is now directed to methods, techniques, infrastructure, and workflows for operations that may be carried out at a resource site. Some operations in the processing procedures, methods, techniques, and workflows disclosed herein may be combined while the order of some operations may be changed. Some embodiments include an iterative refinement of one or more data models associated with the resource site via feedback loops executed by one or more computing device processors and/or through other control devices/mechanisms that make determinations regarding whether a given action, template, or resource data, etc., is sufficiently accurate.

Overview

To address issues associated with removing shear noise from received seismic data, an iterative approach for shear noise removal is proposed where at each iteration, the following operations are performed:

(i) Applying Fourier-Curvelet Transform to received seismic data as an alternate to three-dimensional Curvelet Transform and thereby obtain the benefits of higher dimensional data while not increasing computing costs (see block 102 of FIG. 1).

(ii) Applying an automatic strategy to estimating thresholding parameters (e.g., thresholding parameters associated with a shear noise model) in the Fourier-Curvelet domain based on transforming the received seismic data as indicated at (i) (see block 104 of FIG. 1).

(iii) Predicting approximate estimates indicating shear noise (e.g., shear noise model) comprised in the received seismic data based on at least the thresholding parameter including applying adaptive localized filtering to estimate significant coefficient data related to shear noise (see block 106 of FIG. 1).

(iv) Scaling (e.g., appropriately scaling and/or dynamically scaling) to compensate for data mismatches in amplitude data relative to pressure data and shear noise data comprised in the received seismic data. In particular, data elements associated with the pressure data are scaled based on the denoised vertical component comprised in the seismic data (see block 108 of FIG. 1).

(v) Generating (e.g., computing) first order and second-order statistic data using pressure data, vertical particle velocity data, and an approximate estimate of the shear noise model, resulting in a robust signal-preserving shear noise attenuation (see block 110 of FIG. 1).

(vi) Iterate steps (ii-v) till an envelope ratio of pressure data and vertical geophone data is approximately equal (e.g., similar) (see block 112 of FIG. 1).

These aspects are further discussed below in conjunction with FIGS. 4-9.

Resource Site

FIG. 2 shows a cross-sectional view of a resource site 200 for which the process of FIG. 1 may be executed. While the illustrated resource site 200 represents a subterranean formation, the resource site, according to some embodiments, may be below water bodies such as oceans, seas, lakes, ponds, wetlands, rivers, or other marine environments.

According to one embodiment, various measurement tools capable of sensing one or more resource site data such as seismic two-way travel time, density, resistivity, production rate, etc., of a subterranean formation and/or geological formations may be at the resource site. As an example, wireline tools may be used to obtain measurement information related to geological attributes (e.g., geological attributes of a wellbore and/or reservoir) including geophysical and/or chemical information. For example, the chemical information may include chemical information associated with the subsurface and/or chemical information associated with the surface/above ground areas of the resource site 200.

In some embodiments, various sensors may be located at various locations around the resource site 200 to monitor and collect data for executing the process of FIGS. 1 and 9. In other embodiments, the techniques disclosed herein may be applied to surface seismic monitoring applications, surface gravity applications, surface electromagnetic applications, surface ground heave applications, and surface measurement of induced seismicity applications. According to some implementations, the disclosed techniques may be applied to remote sensing applications, subsea applications associated with permanent sensors, temporary sensor applications, applications associated with remotely operated vehicles, and applications associated with aerial-based measurements.

Part, or all, of the resource site 200 may be on land, on water, or below water. In addition, while a resource site 200 is depicted, the technology described herein may be used with any combination of one or more resource sites (e.g., multiple oil fields or multiple wellsites, one or more saline aquifers, one or more depleted oil/gas fields, etc.), one or more processing facilities, etc. As can be seen in FIG. 2, the resource site 200 may have data acquisition tools 202a, 202b, 202c, and 202d positioned at various locations within the resource site 200. The subterranean structure 204 may have a plurality of geological formations 206a-206d. As shown, this structure may have several formations or layers, including a shale layer 206a, a carbonate layer 206b, a shale layer 206c, and a sand layer 206d. A fault 207 may extend through the shale layer 206a and the carbonate layer 206b. The data acquisition tools, for example, may be adapted to take measurements and detect geophysical and/or chemical characteristics of the various formations shown.

While a specific subterranean formation with specific geological structures is depicted, it is appreciated that the resource site 200 may contain a variety of geological structures and/or formations, sometimes having extreme complexity. In some locations of a given geological structure, for example below a water line (e.g., aquifer) relative to the given geological structure, fluid may occupy pore spaces of the formations. Each of the measurement devices may be used to measure properties of the formations and/or other geological features. While each data acquisition tool is shown as being in specific locations in FIG. 2, it is appreciated that one or more types of measurement may be taken at one or more locations across one or more sources of the resource site 200 or other locations for comparison and/or analysis.

The data collected from various sources at the resource site 200 may be processed and/or evaluated and/or used as training data, and or used to generate high resolution result sets for characterizing a resource at the resource site, and/or used for generating resource models, etc. In one embodiment, the data collected by a set of sensors at the resource site may include data associated with the number of wells of a first reservoir or second reservoir at the resource site, data associated with the number of grid cells of the first or second reservoir, data associated with the average permeability of the first or second reservoir, data associated with the production duration history (e.g., number of years of production) of the first reservoir or second, etc.

Data acquisition tool 202a is illustrated as a measurement truck, which may comprise devices or sensors that take measurements of the subsurface through sound vibrations such as, but not limited to, seismic measurements. Drilling tool 202b may include a downhole sensor adapted to perform logging while drilling (LWD) data collection. The wireline tool 202c may include a downhole sensor deployed in a wellbore or borehole. Production tool 202d may be deployed from a production unit or Christmas tree into a completed wellbore. Examples of resource site data that may be measured include weight on bit, torque on bit, subterranean pressures (e.g., underground fluid pressure), temperatures, flow rates, compositions, rotary speed, particle count, voltages, currents, and/or other parameters of operations as further discussed below.

Sensors may be positioned about the resource site to collect data relating to various resource site operations, such as sensors deployed by the data acquisition tools 202a. The sensor may include any type of sensor such as a metrology sensor (e.g., temperature, humidity), an automation enabling sensor, an operational sensor (e.g., pressure sensor, $H_2S$ sensor, thermometer, depth, tension), evaluation sensors, that can be used for acquiring data regarding the formation, wellbore, formation fluid/gas, wellbore fluid, gas/oil/water comprised in the formation/wellbore fluid, or any other suitable sensor. For example, the sensors may include accelerometers, flow rate sensors, pressure transducers, electromagnetic sensors, acoustic sensors, temperature sensors, chemical agent detection sensors, nuclear sensor, and/or any additional suitable sensors.

In one embodiment, the data captured by the one or more sensors may be used to characterize, or otherwise generate one or more parameter values for a high-resolution result set used to, for example, label or configure a machine learning (ML) engine, a resource model as the case may require. In other embodiments, test data or synthetic data may also be used in developing the ML engine or resource model via one or more parameterization/labeling operations such as those discussed in association with the workflows presented herein.

Evaluation sensors may be featured in downhole tools such as tools 202b-202d and may include for instance electromagnetic, acoustic, nuclear, and optic sensors. Examples of tools including evaluation sensors that can be used in the framework of the current method include electromagnetic tools including imaging sensors such as FMI™ or QuantaGeo™ (mark of SLB, Houston, TX); induction sensors such as Rt Scanner™ (mark of SLB, Houston, TX), multifrequency dielectric dispersion sensor such as Dielectric Scanner™ (mark of SLB, Houston, TX); acoustic tools including sonic sensors, such as Sonic Scanner™ (mark of SLB, Houston, TX) or ultrasonic sensors, such as pulse-echo sensor as in UBI™ or PowerEcho™ (marks of SLB, Houston, TX) or flexural sensors PowerFlex™ (mark of SLB, Houston, TX); nuclear sensors such as Litho Scanner™ (mark of SLB, Houston, TX) or nuclear magnetic resonance sensors; fluid sampling tools including fluid analysis sensors such as InSitu Fluid Analyzer™ (mark of SLB, Houston, TX); distributed sensors including fiber optic. Such evaluation sensors may be used in particular for evaluating the formation in which the well is formed (i.e., determining petrophysical or geological properties of the formation), for verifying the integrity of the well (such as casing or cement properties) and/or analyzing the produced fluid (flow, type of fluid, etc.).

As shown, data acquisition tools 202a-202d may generate data plots or measurements 208a-208d, respectively. These data plots are depicted within the resource site 200 to demonstrate that data generated by some of the operations executed at the resource site 200. Data plots 208a-208c are examples of static data plots that may be generated by data acquisition tools 202a-202c, respectively. However, it is herein contemplated that data plots 208a-208c may also be data plots that may be generated and updated in real time. These measurements may be analyzed to better define properties of the formation(s) and/or determine the accuracy of the measurements and/or check for and compensate for measurement errors. The plots of each of the respective measurements may be aligned and/or scaled for comparison and verification purposes. In some embodiments, base data associated with the plots may be incorporated into site planning, modeling a test at the resource site 200. The respective measurements that can be taken may be any of the above.

Other data may also be collected, such as historical data of the resource site 200 and/or sites similar to the resource site 200, user inputs, information (e.g., economic information) associated with the resource site 200 and/or sites similar to the resource site 200, and/or other measurement data and other parameters of interest. Similar measurements may also be used to measure changes in formation aspects over time.

Computer facilities such as those discussed in association with FIG. 3 may be positioned at various locations about the resource site 200 (e.g., a surface unit) and/or at remote locations. A surface unit (e.g., one or more terminals 320) may be used to communicate with the onsite tools and/or offsite operations, as well as with other surface or downhole sensors. The surface unit may be capable of sending commands to the oil field equipment/systems, and receiving data therefrom. The surface unit may also collect data generated during production operations and can produce output data, which may be stored or transmitted for further processing.

The data collected by sensors may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis or for modeling purposes to optimize production processes at the resource site 200. In one embodiment, the data is stored in separate databases, or combined into a single database.

High-Level Networked System

FIG. 3 shows a high-level networked system diagram illustrating a communicative coupling of devices or systems associated with the resource site 200 as described in FIG. 2. The system shown in the figure may include a set of processors 302a, 302b, and 302c for executing one or more processes discussed herein. The set of processors 302a, 302b, and 302c may be electrically coupled to one or more servers (e.g., computing systems) including memory 306a, 306b, and 306c that may store for example, program data, databases, and other forms of data. Each server of the one or more servers may also include one or more communication devices 308a, 308b, and 308c. The set of servers may provide a cloud-computing platform 310. In one embodiment, the set of servers includes different computing devices that are situated in different locations and may be scalable based on the needs and workflows associated with the resource site 200. The communication devices of each server may enable the servers to communicate with each other through a local or global network such as an Internet network. In some embodiments, the servers may be arranged as a town 312, which are configured as a private or local cloud service for users. A town may be advantageous in remote locations with poor connectivity. Additionally, a town may be beneficial in scenarios with large networks where security may be of concern. A town in such large network embodiments can facilitate implementation of a private network within such large networks. The town may interface with other towns or a larger cloud network, which may also communicate over public communication links. Note that cloud-computing platform 310 may include a private network and/or portions of public networks. In some cases, a cloud-computing platform 310 may include remote storage and/or other application processing capabilities.

The system of FIG. 3 may also include one or more user terminals 314a and 314b each including at least a processor to execute programs, a memory (e.g., 316a and 316b) for storing data, a communication device and one or more user interfaces and devices that enable the user to receive, view, and transmit information. In one embodiment, the user terminals 314a and 314b is a computing system having interfaces and devices including keyboards, touchscreens, display screens, speakers, microphones, a mouse, styluses, etc. The user terminals 314a and 314b may be communicatively coupled to the one or more servers of the cloud-computing platform 310. The user terminals 314a and 314b may be client terminals or expert terminals, enabling collaboration between clients and experts through the system of FIG. 3.

The system of FIG. 3 may also include at least one or more resource sites 200 having, for example, a set of terminals 320, each including at least a processor, a memory, and a communication device for communicating with other devices communicatively coupled to the cloud-computing platform 310. The resource site 200 may also have a set of sensors (e.g., one or more sensors described in association with FIG. 2) or sensor interfaces 322a and 322b communicatively coupled to the set of terminals 320 and/or directly coupled to the cloud-computing platform 310. In some embodiments, data collected by the set of sensors/sensor interfaces 322a and 322b may be processed to generate one or more resource models (e.g., reservoir models) or one or more resolved data sets used to generate the resource model which may be displayed on a user interface associated with the set of terminals 320, and/or displayed on user interfaces associated with the set of servers of the cloud computing platform 310, and/or displayed on user interfaces of the user terminals 314. Furthermore, various equipment/devices discussed in association with the resource site 200 may also be communicatively coupled to the set of terminals 320 and or communicatively coupled directly to the cloud-computing platform 310. The equipment and sensors may also include one or more communication device(s) that may communicate with the set of terminals 320 to receive orders/instructions locally and/or remotely from the resource site 200 and also send statuses/updates to other terminals such as the user terminals 314.

The system of FIG. 3 may also include one or more client servers 324 including a processor, memory, and communication device. For communication purposes, the client servers 324 may be communicatively coupled to the cloud-computing platform 310, and/or to the user terminals 314*a* and 314*b*, and/or to the set of terminals 320 at the resource site 200 and/or to sensors at the oil field, and/or to other equipment at the resource site 200.

A processor, as discussed with reference to the system of FIG. 3, may include a microprocessor, a graphics processing unit (GPU), a microcontroller, a processor module or subsystem, a programmable integrated circuit, a programmable gate array, or another control or computing device.

The memory/storage media discussed above in association with FIG. 3 can be implemented as one or more computer-readable or machine-readable storage media that are non-transitory. In some embodiments, storage media may be distributed within and/or across multiple internal and/or external enclosures of a computing system and/or additional computing systems. Storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. "Non-transitory" computer readable medium refers to the medium itself (i.e., tangible, not a signal) and not data storage persistency (e.g., RAM vs. ROM).

Note that instructions on one computer-readable or machine-readable storage medium, or alternatively, can be on multiple computer-readable or machine-readable storage media distributed in a large system having possibly plural nodes and/or non-transitory storage means. Such computer-readable or machine-readable storage medium or media is (are) considered to be part of an article (or article of manufacture). The storage medium or media can be located either in a computer system running the machine-readable instructions, or located at a remote site from which machine-readable instructions can be downloaded over a network for execution.

It is appreciated that the described system of FIG. 3 is an example that may have more or fewer components than shown, may combine additional components, and/or may have a different configuration or arrangement of the components. The various components shown may be implemented in hardware, software, or a combination of both, hardware, and software, including one or more data processing and/or application specific integrated circuits.

Further, the steps in the flowcharts described below may be implemented by running one or more functional modules in an information processing apparatus such as general-purpose processors, quantum computing system, or application specific chips, such as ASICs, FPGAS, PLDs, GPUs or other appropriate devices associated with the system of FIG. 3. For example, the flowchart of FIG. 1 as well as the flowcharts below may be executed using a data engine/a data processing module (e.g., computing module) stored in memory 306*a*, 306*b*, or 306*c* such that the data engine/data processing module includes instructions that are executed by the one or more processors such as processors 302*a*, 302*b*, or 302*c* as the case may be. The various modules of FIG. 3, combinations of these modules, and/or their combination with general hardware are included within the scope of protection of the disclosure. While one or more computing processors (e.g., processors 302*a*, 302*b*, or 302*c*) may be described as executing steps associated with one or more of the flowcharts described in this disclosure, the one or more computing device processors may be associated with the cloud-based computing platform 310 and may be located at one location or distributed across multiple locations. In one embodiment, the one or more computing device processors may also be associated with other systems of FIG. 3 other than the cloud-computing platform 310.

In some embodiments, a computing system includes at least one processor, at least one memory, and one or more programs stored in the at least one memory, such that the programs comprise instructions, which when executed by the at least one processor, are configured to perform any method disclosed herein.

In some embodiments, a computer readable storage medium is included, which has stored therein one or more programs, the one or more programs including instructions, which when executed by a processor, cause the processor to perform any method disclosed herein. In some embodiments, a computing system includes at least one processor, at least one memory, and one or more programs stored in the at least one memory for performing any method disclosed herein. In some embodiments, an information processing apparatus for use in a computing system is configured to perform any method disclosed herein.

Embodiments

Ocean bottom node (OBN) technologies may be used for seismic data acquisition scheme in a marine environments. In OBN acquisition, data is acquired using hydrophones and geophones to record complete elastic wavefields propagated in the subsurface. During the pre-processing stage of said recorded wavefields, pressure data and vertical geophone component data may be used to perform pre-processing operations including de-ghosting operations, de-multiple operations using either up-down deconvolution (UDD) operations, and/or multi-dimensional deconvolution (MDD) operations. According to one embodiment, an assumption made in association with UDD or MDD operations is to have a better signal-to-noise (SNR) ratio across both the pressure data and the vertical geophone data comprised in the captured seismic wavefield (e.g., captured seismic data). However, vertical geophone data may be contaminated by strong converted shear wave data due to signal scattering across the ocean-bottom subsurface.

According to one embodiment, the disclosed process hinges on the fact that the pressure data and vertical geophone data components exhibit similar wavefield characteristics (e.g., characteristics including amplitude, moveout of wavefield events including reflection, refraction, and diffraction) except for the polarity difference (e.g., phase of the wavefield which may be different) between the pressure data and the vertical geophone data. Also, the pressure data (e.g., pressure component comprised in the received seismic wavefield) is noise-free and as such does not contain shear noise. Thus, the pressure data may be used as prior information to differentiate between the shear noise data and coherent signal data comprised in the vertical geophone data. The disclosed process relies on first estimating the envelope of both the pressure data and the vertical geophone data in a sparsifying domain followed by computing envelope ratio data indicating a scaling the pressure component followed by a threshold-based filtering process to remove the shear noise data. The shear noise, according to one embodiment, comprises unwanted seismic signals or unwanted seismic data generated as a result of the propagation of shear waves (S-waves) associated with the transmitted seismic data within the subsurface.

The choice of the domain where this ratio is computed varies from a Tau-P domain, a dual-true complex wavelet domain, or 2D or 3D Curvelet domain. In the disclosed context of seismic data processing and analysis, the "envelope" of a wavefield can represent the captured seismic wave's amplitude variation over time. For example, the envelope can capture the maximum amplitude of the seismic wavefield or seismic wave at each point in time. When seismic waves propagate through the Earth, they cause variations in pressure or particle motion, which are recorded by seismic sensors. These recorded signals can comprise complex waveforms with varying amplitudes and frequencies. The envelope of the wavefield enables a simplified representation of these waveforms by highlighting the maximum amplitude of the wave at each time step. Furthermore, the envelope can be obtained, for example, by processes including Hilbert transform operations. Once extracted, the envelope can be used for various purposes in seismic data analysis, such as detecting seismic events, characterizing the energy distribution of the seismic signal, or identifying amplitude anomalies associated with geological features like faults or hydrocarbon reservoirs. Thus, the envelope of a wavefield in seismic data refers characterizes the maximum amplitude variation of the seismic wave over time, enabling valuable information for seismic data interpretation and analysis.

According to one embodiment, an iterative approach in the Fourier-Curvelet domain is leveraged to perform shear noise attenuation within captured seismic data. Compared to other solutions, the disclosed process not only reduces the computational burden associated with 3D Curvelet Transforms but also enables an automatic thresholding and signal preservation framework thereby overcoming inefficient manual interventions during the shear noise attenuation process. The inefficient manual interventions are not only expensive but also make it difficult to leverage signal processing techniques to optimally attenuate shear noise. Furthermore, the disclosed approach enables a robust process for estimating loss-free clean vertical geophone component comprised in captured seismic data.

In an exemplary embodiment, the following relationship is used in association with shear noise attenuation in a Curvelet domain where an envelope ratio scaling (ERS) for each scale and angle is computed:

$$C(s, d, t, x) = \frac{\sqrt{P(s, d, t, x, \text{real})^2 + P(s, d, t, x, \text{imag})^2}}{\sqrt{V_z(s, d, t, x, \text{real})^2 + V_z(s, d, t, x, \text{imag})^2}}, \quad (1)$$

where P and $V_z$ represent the pressure and vertical geophone components, respectively, comprised in the received seismic data. In equation (1), s, d, t, and x represent scale, dip, time, and space scalar vectors, respectively. In some cases, the scale, dip, time, and space domain scalar vectors are associated with a Curvelet Transform. Note that a direct application of scalar vector C to $V_z$ (e.g., $V_z$(s, d, t, x)=C(s, d, t, x)$\odot V_z$(s, d, t, x)) results in calibrated $V_z$ data components with respect to P (e.g., P and $V_z$ matches in amplitude data) while keeping both the signal component and noise component in $V_z$. As used in this context, the operator $\odot$ represents an element-wise multiplication. To remove shear noise, a thresholding-based filtering process in the Curvelet domain may be used, where the thresholding operator can be hard, soft, stein, or a combination of hard, soft, and/or stein operators as the case may require. According to one embodiment, an exponential shrinkage operator may be used and is given by:

$$C_{thres}(s, d, t, x) = C(s, d, t, x) \odot \exp\left(-\left(\frac{\mu_{s,d}}{|C(s, d, t, x)|}\right)^{2-p}\right), \quad (2)$$

where |x| represent the magnitude of x and the threshold parameter $\mu_{s,d}$ is inversely proportional to the signal-to-noise ratio (SNR) at any pixel in the Curvelet domain (e.g., a high SNR results in a low threshold value or vice-versa). Note that equation (2) corresponds to a stein thresholding operator for p=0 and soft thresholding operator for p=1. To perform noise attenuation, $C_{thres}$ can be applied to $V_z$, such that $V_{z-thres}$(s, d, t, x)=$C_{thres}$(s, d, t, x)$\odot V_z$(s, d, t, x).

While equation (2) provides a thresholding operator to remove shear noise, there are several pitfalls in this approach. Firstly, estimation of the thresholding parameter in the Curvelet domain can be a time-consuming process that requires lots of intervention and qualitative analysis. Secondly, even after finding the appropriate thresholding operator, the outcome can result in signal leakage especially in areas where weak coherent signal is buried beneath the strong shear noise. This is because harsh thresholding may have been used to remove the shear noise. Thus, the probability of the thresholded coefficients to contain both signal and shear noise is quite high. Thirdly, the thresholding approach assumes that pressure data and vertical geophone data are properly calibrated such that the envelop computed can differentiate between signal component and noise component comprised in the captured seismic data. However, for calibration to work optimally, the vertical geophone component should be free-from noise. Hence, the calibration in some cases is sub-optimal, which further impacts the quality of the estimation of shear-noise. Because of these pitfalls, extra data processing may be needed post-shear noise attenuation to perform signal protection and thereby preserve weak and/or strong signal leakage due to thresholding, which can result in adding back some of the weak shear noise back to the clean signal estimate. This post-attenuation workflow may be cumbersome and can vary from one survey to another (e.g., shallow-to-deep environments). Finally, the computational cost of the higher-dimensional Curvelet Transform (e.g., going beyond 2D) is prohibitively expensive, especially for large scale seismic datasets. For example, the cost of 3D Curvelet Transform, according to some implementations, is approximately 10-100 times more than the cost of 2D Curvelet Transform, depending upon the sampling of the data (e.g., denser sampled data results in higher computational cost). In such cases, 2D Curvelet Transforms may be used for shear noise attenuation which can result in sub-optimal noise attenuation.

To overcome these pitfalls, the disclosed solution can be configured as an iterative approach in the Fourier-Curvelet domain where at each iteration, a series of processing techniques may be dynamically or adaptively applied to automatically perform noise attenuation followed by the signal protection of captured seismic data. Each of these sub-steps are explained in detail below followed by the explanation on the usability of the Fourier-Curvelet Transform. Furthermore, the disclosed iterative approach, according to some embodiments, highlights the robustness of the disclosed shear-noise estimation and/or attenuation process.

Automatic Thresholding

According to one embodiment, the first step in the shear-noise attenuation process is estimating a thresholding parameter $\mu_{s,d}$ at each scale and angle in Curvelet domain for captured seismic data. The thresholding parameter may be defined using a stochastic process (e.g., a random process or a trial-and-error process) or using an adaptive or dynamic approach based on the following equation:

$$\mu_{s,d} = \omega_{user} \frac{\sigma^2}{\sigma_x}, \tag{3}$$

where, $\omega_{user}$ is a defined percentage weight, $\sigma_x$ is the signal variance data that can be estimated using hydrophone data $P_{(s,d,t,x)}$, $\sigma$ represents noise variance data that can be estimated using a robust median estimator given by:

$$\sigma = \frac{\text{median}(V_{z_{(s,d,t,x)}})}{\lambda}, \tag{4}$$

where $\lambda$ is a constant value equal to 0.6745. While this approach uses second order statistics from the captured seismic data to estimate $\mu_{s,d}$, usage of a fixed $\lambda$ and user-defined $\omega_{user}$ does not overcome the laborious testing time required to estimate $\mu_{s,d}$. While the robust median estimator assumes no information on the noise model, it can be demonstrated that for scenarios where the noise model is estimated from the captured seismic dataset, both $\sigma$ and $\sigma_x$ can be automatically estimated using:

$$\sigma^2 = \sigma_{V_z}^2 - \sigma_P^2, \tag{5}$$

$$\sigma_x = \sqrt{\max(\sigma_p^2 - \sigma^2, 0)},$$

where $$\sigma_{V_z}{}^2 \text{ and } \sigma_p^2$$

represent the variance of vertical velocity and pressure components, respectively, of the captured seismic data. Using the components of equation (5), equation (3) can be modified as follows:

$$\mu_{s,d} = \frac{\sigma^2}{\sigma_x}, \tag{6}$$

which enables a user-free automatic way to compute appropriate thresholding values without performing time-consuming testing during the noise attenuation process.

Adaptive Localized Filtering

While the automatic thresholding computed using equation (6) mitigates user-intervention to estimate $\mu_{s,d}$, the thresholding procedure enabled by equation (2) can result in signal leakage especially in regions where strong shear noise overlays coherent signals (e.g., desired component) of interest. This is because the thresholding process estimates noise values at each pixel value across all scales and angles such that higher threshold values often result in weak signal leakage. Ideally, shear noise may be expected to be mapped to limited scale and angles values in the Curvelet domain because it is low frequency in nature and travel within certain wave speeds. Since both P and $V_z$ are sometimes not perfectly calibrated because of the presence of shear noise, it can be expected that much more data can be mapped to the noise model after thresholding. Thus, it can be expected that some of the estimated noise coefficients exhibit signal leakage. For scenarios where calibration is not perfect, it is desirable to keep the high amplitude ratio coefficients in $C_{thres}(s, d, t, x)$ while avoiding the low-amplitude coefficients, which might contain signal leakage.

Since these high amplitude coefficients can be seen as outliers and can be sparse in nature, a root-mean-square (e.g., quadratic mean) technique may be used to estimate these coefficients. Therefore, the root-mean-square (RMS) technique may be applied in a sliding window where a multi-dimensional window of specified length moves over each scale and angle wedge in the Curvelet domain. Hence, the RMS may be defined as the square root of the arithmetic mean of the squares of a set of pixel values. The RMS values may be assigned to the central pixel of the multi-dimensional window before moving to the next pixel value. The size of the sliding window may also be changed from scale to scale as since the sampling of each Curvelet scale and wedge is a function of frequency and wavenumber content represented by the corresponding wedge. Thus, a scale capturing low-frequencies consistent with less samples as compared to mapping high-frequencies is preferable. Therefore, the window size of scales and angles representing lower frequency and wavenumbers are small whereas bigger window sizes are used for scale and angle values having high frequencies and wavenumber wedges. This results in an adaptive localized filtering approach that keeps high amplitude noise location coefficients after thresholding thereby preserving signal leakage at the low-amplitude coefficient locations.

Optimum Bayesian Weighting

Although adaptive localized filtering mitigates signal leakage at low-amplitudes noise locations in the Curvelet domain, the thresholding can be harsh at the locations of the coefficients in Curvelet domain contaminated with noise (e.g., shear noise). This is not a good idea as high amplitude envelope ratio scaling (ERS) locations do contain some coherent signals in the Curvelet domain. To find out the optimal thresholding at the locations of shear noise in the Curvelet domain, the second order statistic values may be used to estimate the vertical particle velocity measurements $\widehat{V_z}$ optimally in the minimum mean square error sense. The estimated vertical particle velocity data can be obtained as a weighted linear combination of the recorded pressure data and the particle velocity data using:

$$\hat{V}_z = w_p^H P_n + w_z^H V_{zn}, \tag{7}$$

where $w_p$ and $w_z$ correspond to weights leading to the optimal vertical particle velocity data. Denoting the vectors of the weights and measurements by $\overline{w}$ and $\overline{D}$ in equation (7), the weights can be obtained by reformulating the problem as a minimum mean square error problem given by:

$$w = \underset{\underline{w}}{\arg\min} E\left\{ |\hat{V}_z - V_{zn}|^2 \right\} \qquad (8)$$

$$= \underset{\underline{w}}{\arg\min} E\left\{ |\underline{w}^H \underline{D} - V_{zn}|^2 \right\},$$

where $E\{\bullet\}$ is the expectation operator (e.g., probabilistic expected value operator) taken over the pressure data, velocity measurement data, and noise distributions data. The minimizer of the cost function may be called the linear minimum mean square error estimator which is a function of the second order statistics of the unknown noise-free vertical particle velocity $V_z$. The minimizer of equation (8) can be expressed as the solution of the following relationship:

$$R_{DD}\underline{w} = \underline{r}_{DV_z} \qquad (9)$$

where $R_{DD}$ represents the measurement covariance matrix and $\underline{r}_{DV_z}$ corresponds to the correlation vector between the measurement data and the desired noise-free vertical particle velocity wavefield.

$$R_{DD} = \begin{bmatrix} \sigma_{P_n}^2 & \sigma_{P_n V_{zn}} \\ \sigma_{V_{zn} P_n} & \sigma_{V_{zn}}^2 \end{bmatrix} \qquad (10)$$

$$\underline{r}_{DV_z} = \begin{bmatrix} \sigma_{P_n V_z} \\ \sigma_{Z_n V_z} \end{bmatrix}$$

where $\sigma_{XY}$ is the correlation between X and Y. According to one embodiment, X and Y represent the vector field within which the correlation $\sigma_{XY}$ is computed. X is pressure and Y is vertical component. Note that the covariance matrix in equation (10) can be estimated directly from the measured data. In one embodiment, the windowed frequency wavenumber domain (e.g., F-k domain) represents the domain where these statistics are computed. It is appreciated that the statistics could be computed in different domains other than the F-k domain. If the noise variance of the pressure and the vertical particle velocity data are represented by $\sigma_{n_p}^2$ and $\sigma_{n_z}^2$ respectively, and assuming that the noise in the pressure data is uncorrelated with the noise in the vertical particle velocity data, then the correlation vector $\underline{r}_{DV_z}$ can be expressed as:

$$\underline{r}_{DV_z} = \begin{bmatrix} \sigma_{P_n V_{zn}} \\ \sigma_{V_{zn}}^2 - \sigma_{n_Z}^2 \end{bmatrix} \qquad (11)$$

The correlation vector $\underline{r}_{DV_z}$ can be calculated in addition to the correlation matrix $R_{DD}$ from the data in different domains. Note that the solution in equation (7) can be extended to include the inline and crossline velocity measurements. In this extended multi-measurement formulation, the estimated vertical particle velocity wavefield can be configured as a weighted sum of the measurement vector $\underline{D}$ given by:

$$\hat{V}_z = \underline{w}^H \underline{D} = \underline{r}_{DV_z}^H R_{DD}^{-1} \underline{D} = \underline{r}_{DV_z}^H R_{DD}^{-1} \begin{bmatrix} P_n \\ X_n \\ Y_n \\ V_{zn} \end{bmatrix} \qquad (12)$$

From the previous equations, the vertical particle velocity data can be estimated using:

$$\hat{V} = \frac{\sigma_{V_Z} P \, P^{\sigma_{n_{V_z}}^2}}{(\sigma_P^2 + \sigma_{n_p}^2)(\sigma_{V_z}^2 + \sigma_{n_z}^2) - \sigma_{PV_2}\sigma_{V_zP}} P_n + \qquad (13)$$

$$\frac{\sigma_P^2 \sigma_{V_z}^2 - \sigma_{PV_2}\sigma_{V_zP} + \sigma_{V_z}^2 \sigma_{n_p}^2}{(\sigma_P^2 + \sigma_{n_p}^2)(\sigma_{V_z}^2 + \sigma_{n_z}^2) - \sigma_{PV_2}\sigma_{V_zP}} V_{zn}$$

If it is assumed that the noise data in the pressure data is zero $$\left( \text{i.e., } \sigma_{n_P}^2 = 0 \right),$$

and thee cross-correlation coefficient $$\rho = \frac{\sigma_{V_z P}}{\sigma_{V_z}\sigma_P}$$

and the signal-to-noise ratio $$(SNR)\zeta_{V_z} = \frac{\sigma_{V_z}^2}{\sigma_{n_Z}^2},$$

then the following relationship can be established:

$$\hat{V}_z = \frac{\rho \dfrac{1}{\zeta_{V_z}} \dfrac{\sigma_{V_z}}{\sigma_P}}{1 + \dfrac{1}{\zeta_{V_z}} - \rho^2} P_n + \frac{1 - \rho^2}{1 + \dfrac{1}{\zeta_{V_z}} - \rho^2} V_{zn} \qquad (14)$$

Note that if $\zeta_{V_z}$ is high, then $\widehat{V_z} \sim V_{zn}$. However, if $\zeta_{V_z}$ is low and the correlation coefficient is high (i.e., $\rho \approx 1$), then $$\hat{V}_z \approx \rho \frac{\sigma_{V_z}}{\sigma_P} P_n.$$

It is clear from this that in areas where the SNR is low at the vertical particle velocity measurement, then $$\hat{V}_z \approx \rho \frac{\sigma_{V_z}}{\sigma_P} P_n.$$

Automatic Scaling

According to one embodiment, the underlying assumption leveraged for the disclosed solution is that the pressure data and the noise-free vertical velocity data is calibrated when using an envelope ratio to differentiate between signal and noise in the vertical velocity component. However, it is challenging to optimally scale the pressure and vertical components estimated from a given resource site since the vertical component comprised in the acquired seismic data contains the shear-noise. To overcome this apart from automatic thresholding, a scaling step is defined in an iterative approach, where the pressure component comprised in the acquired seismic data is scaled with respect to the estimate of the noise-free vertical component at each iteration as exemplified using:

$$P_{cal}(s, d, t, x) = P(s, d, t, x)/a(s, d, t, x), \qquad (15)$$

where the scaling parameter $\alpha(s, d, t, x)$ is estimated as follows:

$$\alpha(s, d, t, x) = \frac{\sqrt{P(s, d, t, x, \text{real})^2 + P(s, d, t, x, \text{imag})^2}}{\sqrt{V_{z\text{-}thres}(s, d, t, x, \text{real})^2 + V_{z\text{-}thres}(s, d, t, x, \text{imag})^2}} \qquad (16)$$

Here, the thresholded vertical component is represented as $V_{z\text{-}thres}$. According to one embodiment, scaling is applied to the $V_z$ component which can make the quality control of attenuated shear noise challenging as it will not be possible to find out what is being removed from the acquired vertical component of the captured seismic data from a site (e.g., a resource site). To mitigate this, a scaling of the pressure component may be performed. Thus, the removed shear noise may be compared to the original acquired vertical component comprised in the captured seismic data. According to one embodiment, the original pressure component may be reverted to once the shear noise attenuation process is completed to proceed further with the up-down decomposition process.

Fourier-Curvelet Domain

According to some embodiments, a novel approach is demonstrated to overcome the computational burden of 3D Curvelet Transform while performing shear noise attenuation. Some implementations associated with large-scale ocean bottom node surveys rely on performing shear-noise attenuation along common source lines using the two-dimensional aspect of both the data and Curvelet Transform because the cost of the 3D Curvelet Transform is of the order of ~10-100 times more relative to the 2D Transform. However, the quality of the 2D Curvelet Transform is sub-optimal relative to the 3D Curvelet Transform, according to some embodiments. To overcome the computation costs of the 3D Curvelet Transform, a common receiver gathers may be projected using a structure (e.g., a 3D data structure) into a lower two-dimensional subspace. To do this projection, it is assumed that the seismic data is composed of different wavenumbers or ray parameters. It is appreciated that the ray parameter(s), which may be represented using the symbol p, can characterize the angle of propagation and the velocity of seismic waves as said waves travel through the subsurface. Therefore, if the seismic data can be decomposed into different wavenumbers, then these wavenumbers can be processed independently to produce results as if all the wavenumbers are processed jointly. Using this insight about the seismic data, the following operations may be executed on captured seismic data:

(i) Apply Fourier or radon Transform along the coarsely sampled spatial direction of the common receiver gathers (e.g., captured seismic data). This will decompose the data into common wavenumber along the crossline direction.

(ii) Perform shear noise attenuation on common wavenumber panels.

(iii) Once all common wavenumber panels are done, apply inverse Fourier Transform along the estimated signal and noise model along the coarsely sampled spatial direction to Transform the data back to the physical domain. This enables the reduction of one of the dimensions of the problem and thereby save the computational and memory costs during noise estimation.

Note that the proposed approach is not limited to receiver gathers (e.g., common receiver gathers) but can be applied to project five-dimensional seismic data to a three-dimensional or to a two-dimension space by using a series of Fourier Transforms along different dimensions of the five-dimensional datasets. FIG. 4 illustrates an exemplary process for projecting higher dimensional data into a lower-dimensional subspace representing a wavenumber (e.g., a common wavenumber) domain. In particular, a plurality of captured seismic data 402 associated with a common receiver may be transformed into a common receiver format (e.g., common receiver t-x-ky format) following which the common receiver format is transformed to a common wavenumber data 404. A domain change may be applied to the common wavenumber data 404 to generate output data 406 to which noise attenuation (e.g., shear noise attenuation operations) may be applied.

Iterative Workflow

The disclosed solution comprises an iterative approach in the Fourier-Curvelet domain for attenuating noise (e.g., shear noise) comprised in captured seismic data. This computationally cost-effective iterative workflow enables an automatic end-to-end framework for shear noise attenuation starting from the estimation of the thresholding parameters to protection of both strong and weak signal components (e.g., desired signal components of captured seismic data) of the coherent signal. It is appreciated that an exemplary stopping criterion or condition that terminates the iteration comprises or is based on the fact that the envelope ratio scaling (ERS) computed on the pressure data comprised in the captured seismic data and which is calibrated (e.g., optimally calibrated) to be a noise-free vertical component is designated to have a value of one.

Iterative Workflow in the Fourier-Curvelet Domain

Input:

Extract P and $V_z$ components of captured seismic data in the temporal spatial domain, Apply forward Fourier Transform along a spatial dimension along which data is coarsely sampled to transform one dimension from space to wavenumber domain, $P_k$=Fourier(P) and $V_{z_k}$=Fourier($V_z$), Apply a function Ø to compute envelope ratio scaling (ERS) by having the function Ø operate on pressure data and particle velocity data associated with each scale and angle of the propagated seismic wavefield in the curvelet domain.

$k_n$: total number of common wavenumbers gathers,

For i in 1: $k_n$

Map each common wavenumber gather of $P_k$ and $V_{z_k}$ components to 2D Curvelet domain, i.e., $P_{k_i}(s, d, t, x)$ &

$$V_{z_{k_i}}(s, d, t, x),$$

for notation simplification, he subscripts $k_i$ in the following step can be omitted from both P and $V_z$ while $\emptyset(P(s, d, t, x), \hat{V}(s, d, t, x)) < 1$:

i) Compute envelope ratio scaling $$C(s, d, t, x) = \frac{\sqrt{P(s, d, t, x, \text{real})^2 + P(s, d, t, x, \text{imag})^2}}{\sqrt{V_z(s, d, t, x, \text{real})^2 + V_z(s, d, t, x, \text{imag})^2}}$$

ii) Using $P(s, d, t, x)$ and $V_z(s, d, t, x)$, compute $$\mu_{s,d} = \frac{\sigma^2}{\sigma_x},$$

where $\sigma^2 = \sigma V_z^2 - \sigma_P^2$, and $$\sigma_x = \sqrt{\max(\sigma_P^2 - \sigma^2, 0)},$$

iii) Create thresholding operator $$C_{thres}(s, d, t, x) = C(s, d, t, x) \odot \exp\left(-\left(\frac{\mu_{s,d}}{|C(s, d, t, x)|}\right)^{2-p}\right),$$

iv) Apply adaptive localized filtering on $C_{thres}(s, d, t, x)$ to keep significant coefficients, v) Perform signal estimation of vertical component in Curvelet domain as $V_{z\text{-}thres}(s, d, t, x) = V_z(s, d, t, x) \odot (C_{thres}(s, d, t, x)$, vi) Apply inverse 2D Curvelet Transform to compute $V_{z\text{-}thres}$ in the temporal-spatial domain, vii) Compute shear noise model $N_{shear} = P - V_{z\text{-}thres}$, viii) Using $N_{shear}$, P and $V_z$, apply optimum Bayesian weighting based signal estimation, i.e., $$\hat{V} = \frac{\sigma_{V_zP}\sigma_{n_{V_z}}^2}{(\sigma_P^2 + \sigma_{nP}^2)(\sigma_{V_z}^2 + \sigma_{n_Z}^2) - \sigma_{PV_z}\sigma_{V_zP}}P_n + $$
$$\frac{\sigma_P^2\sigma_{V_z}^2 - \sigma_{PV_z}\sigma_{V_zP} + \sigma_{V_z}^2\sigma_{np}^2}{(\sigma_P^2 + \sigma_{nP}^2)(\sigma_{V_z}^2 + \sigma_{n_Z}^2) - \sigma_{PV_z}\sigma_{V_zP}}V_z,$$

this process is applied in the localized temporal-spatial windows using Fourier-wavenumber domain, ix) Transform estimated signal model $\hat{V}$ in Curvelet domain to create $\hat{V}(s, d, t, x)$, x) At each scale and angles, use $\hat{V}(s, d, t, x)$, and $P(s, d, t, x)$ to compute scaling factor $$\alpha(s, d, t, x) = \frac{\sqrt{P(s, d, t, x, \text{real})^2 + P(s, d, t, x, \text{imag})^2}}{\sqrt{\hat{V}(s, d, t, x, \text{real})^2 + \hat{V}(s, d, t, x, \text{imag})^2}},$$

xi) Create scaled pressure component, i.e., $P(s, d, t, x) = P(s, d, t, x)/\alpha(s, d, t, x)$ end Apply inverse Fourier Transform to create signal model $\hat{V}$ in the physical domain.

Output: estimated signal model $\hat{V}$

Exemplary Results

The performance of the proposed iterative shear noise attenuation workflow was tested with automatic signal protection on a node gather extracted from a seismic dataset. The data was acquired using a hexasource system that shoots, at 25 m by 30 m, a dense shot carpet with receiver spatially configured to be 50 m×200 m inline relative to the dense shot carpet. In one tested implementation, shear noise was seen as a significant issue affecting the four-dimensional (4D) amplitude fidelity.

FIGS. 5A and 5B show exemplary two-dimensional subsections extracted from a common receiver gather for both P and $V_z$, respectively. FIG. 5A shows the pressure data associated with the captured seismic data while FIG. 5B represents the vertical particle velocity component data associated with the captured seismic data. As can be seen in FIG. 5B, the shear noise is rather visible on $V_z$ as indicated by the arrows in the figure such that the shear noise is strongly overlayed over the weak reflection energy. It is appreciated that these figures highlight the benefits of using automatic thresholding over other inefficient time-consuming thresholding selection criteria.

The benefits of introducing the adaptive localized filtering approach to recover some of the weak signal losses during the thresholding process is one benefit of the disclosed solution. Further, the disclosed solution demonstrates the benefits of using an optimum Bayesian weighting scheme to extract optimum signal and noise models out of captured seismic data without losing the desired signal. Finally, results of other thresholding schemes are compared to the disclosed iterative approach to showcase novel aspects of the proposed framework.

Automatic Thresholding

According to one embodiment, the disclosed approach advantageously uses an automatic thresholding approach relative to other thresholding processes which often are inefficient and require lots of testing time before determining thresholding values for each scale and angle in the Curvelet domain. In particular, the disclosed analysis leverages a two-dimensional Curvelet Transform or three-dimensional Curvelet Transform or other higher dimensional Curvelet Transform greater than the two-dimensional or three-dimensional Curvelet Transform for noise reduction or noise elimination in captured seismic data.

FIG. 6A shows an exemplary visualization indicating a two-dimensional Curvelet Transform that is generated based on noise attenuation along independent source lines of captured seismic data. FIG. 6B shows an exemplary visualization indicating a Fourier-Curvelet domain that exploits the benefits of the higher dimension of captured seismic data. FIG. 6C shows Fourier-Curvelet domain along with adaptive localized filtering of captured seismic data. FIG. 6D illustrates an exemplary visualization generated from an iterative workflow involving Fourier-Curvelet domain, adaptive localized filtering, and optimum Bayesian weighting on captured seismic data. It is appreciated that FIGS. 6A and 6C show the estimated signal and noise model using an alternative (e.g., manual) thresholding criteria where thresholded values are set for each scale and angle based on trial-and-error or some other stochastic process. Such a process may involve setting a range of thresholded values, performing the thresholding in the Curvelet domain and coming back in the time-space domain to compare the estimated signal and noise model. This thresholding process can consume lots of user time.

FIGS. 6B and 6D show the outcome of the disclosed automatic thresholding process. It can be seen from these figures that the automatic thresholding process attenuates more shear noise at the expense of losing weak coherent energy across both shallow and deeper time sections. To prevent this signal loss, one or more signal protection steps or computing operations may be used to estimate the loss-free shear noise model as further discussed below.

Iterative Workflow

It is here illustrated the advantage of the different steps associated with the iterative workflow in producing a loss-free noise model. FIG. 7A shows an estimated signal model using a two-dimensional Curvelet Transform-based approach where noise attenuation is performed along independent source lines. FIG. 7B shows an estimated signal model using the Fourier-Curvelet domain to exploit the benefits of the higher dimension of the received seismic data. FIG. 7C shows an estimated signal model using the Fourier-Curvelet domain along with adaptive localized filtering. FIG. 7D shows an estimated signal model using an iterative workflow involving the Fourier-Curvelet domain, adaptive localized filtering, and optimum Bayesian weighting processes.

FIG. 8A shows an estimated shear noise model using a two-dimensional Curvelet Transform-based approach where noise attenuation is performed along independent source lines. FIG. 8B shows an estimated shear noise model using the Fourier-Curvelet domain to exploit the benefits of the higher dimension of the data. FIG. 8C shows an estimated shear noise model using the Fourier-Curvelet domain along with adaptive localized filtering. FIG. 8D shows an estimated shear noise model using an iterative workflow involving the Fourier-Curvelet domain, adaptive localized filtering, and optimum Bayesian weighting.

A first comparison shows the advantage of the Fourier-Curvelet approach over a two-dimensional Curvelet framework. FIG. 7A shows an exemplary estimated signal model while FIG. 8A shows the corresponding shear noise model using a two-dimensional Curvelet approach where each source line is processed independently. In some cases, each "source line" refers to a linear arrangement or paths along which seismic energy sources are deployed to generate seismic waves. These waves can propagate through the subsurface and can be recorded by receivers (e.g., such as geophones or hydrophones) to create a seismic image of the subsurface structure of a resource site.

According to one embodiment, 5 scales and 16 angles were used as the highest scale in the Curvelet domain. FIGS. 7B and 8B respectively show the signal model and the noise model, respectively, estimated using the Fourier-Curvelet approach. When comparing FIGS. 7A and 7B, it is evident that the incorporation of a third dimension during the thresholding stage improves the preservation of weak coherent energy as highlighted by the arrows in FIG. 7B, whereas the loss in coherent signal energy (e.g., indicated as arrows in FIG. 7A) when the two-dimensional thresholding approach is used.

Next, the benefits of incorporating an adaptive localized filtering or data processing approach that preserves weak energy losses due to harsh thresholding selections is demonstrated. In FIGS. 7C and 8C, the outcome of the Fourier-Curvelet domain-based noise attenuation together with adaptive localized filtering is demonstrated. When comparing results based on the Fourier-Curvelet domain only as indicated by the arrows in FIG. 7B, it can be seen that significant improvement in both the continuity and coherency of events both at the shallow and deeper time sections are highlighted by said arrows. The recovery of this weak signal is evident clearly in the noise sections (see FIG. 8C) where the arrows show the signal recovery areas, whereas the signal loss is visible when using only the Fourier-Curvelet approach indicated as arrows in FIG. 8B. Finally, the benefits of optimum Bayesian weighting are exhibited in FIGS. 7D and 8D in both the optimal signal estimation and shear noise attenuation, especially at the lower end of the frequency spectrum. Optimum Bayesian weighting, according to one embodiment, may use the pressure component, true vertical component, and/or the estimated shear noise model (see FIG. 8C) to estimate the first and second order statistics and thereby estimate the optimal weighted signal and noise model. As a result, the signal across the full frequency spectrum may be preserved as indicated in FIGS. 7D and 8D. The incremental improvement enabled by the Fourier-Curvelet Transform, adaptive localized filtering, and the optimum Bayesian weighting showcase that the proposed framework is robust in preserving both strong and weak coherent energy when performing shear noise attenuation using pressure and vertical particle velocity data.

It is appreciated that shear noise attenuation from the vertical particle velocity component comprised in captured seismic data may be performed while processing an ocean bottom node (OBN) dataset. Some workflows rely on using the pressure component as an indicator to differentiate between shear noise and the signal comprised in the vertical component. In some implementations, the Curvelet Transform may be a preferred domain to perform shear-noise attenuation. While two-dimensional Curvelet Transforms can generate estimates of the signal model, using higher dimensional Curvelet Transforms enable more stability when estimating the signal model. The underlying noise attenuation framework can be used to compute an envelope ratio between pressure and vertical component. The complexity of any shear noise attenuation workflow based on pressure and vertical component can involve preserving the low-amplitude coherent energy buried beneath strong noise. It is appreciated that OBN datasets or OBN data can refer to seismic data acquired using nodes or receivers placed on the ocean floor for marine seismic surveys. These nodes can be equipped with sensors (e.g., geophones or hydrophones) that record seismic waves generated by controlled sources such as airguns or marine vibrators.

The disclosed solution leverages an iterative framework to perform optimal shear noise attenuation where each iteration involves: i) using a Fourier-Curvelet Transform domain to reduce the computational complexity of three-dimensional Curvelet Transform; ii) an automatic approach that estimates a thresholding parameter at each scale and angle, which is data-dependent and uses second-order statistics from P and $V_z$ to define an appropriate thresholding level; ii) using an adaptive filtering approach to keep or retain significant coefficients in the thresholded data; iii) automatically scaling P using the estimated signal component from $V_z$ to compensate for any scaling discrepancy between these two components; iv) using optimum Bayesian weighting where the second-order statistics are computed using pressure data, vertical particle velocity data, and estimated shear noise model to perform optimal shear noise attenuation.

Exemplary Flowchart

FIGS. 9A and 9B shows an exemplary detailed workflow 900 for attenuating noise data comprised in captured seismic data. It is appreciated that a data engine stored in a memory device may cause a computer processor to execute the various processing stages of the workflow 900. For example, the disclosed techniques may be implemented as a data engine within a geological software tool such that the data engine enables the modeling of geological structures (e.g., wells, reservoirs, etc.) in the subsurface of a resource site based on the processes outlined herein.

At block 902, the data engine may receive captured seismic data from one or more sensors deployed about a resource site, the captured seismic data comprising signal component data and the noise component data. It is appreciated that the seismic data may be derived from fiber optic data, multicomponent towed streamer (e.g., isometrix) data, geophone data, hydrophone data, pressure sensor data, signal acceleration sensor data, etc.

At block 904, the data engine may extract, in a first data domain, velocity data and pressure data comprised in the captured seismic data and thereby generate first domain data including first pressure data and first velocity data in the first data domain.

Turning to block 906, the data engine may transform, from the first data domain to a second data domain (e.g., 3-dimensional transform domain, 5-dimensional transform domain, a sparsity-based or a sparsity promoting domain), the first velocity data and the pressure data in the first domain and thereby generate second domain data including second pressure data and second velocity data in the second data domain. At block 908, the data engine may map wavenumber gather data associated with the second pressure data and the second velocity data from the second data domain to a third data domain.

At block 910, the data engine may apply an enveloping function to the second pressure data and the second velocity data and thereby determine envelope ratio scaling data for the captured seismic data. In addition, the data engine may generate, based on the second pressure data and the second velocity data, threshold value data for the captured seismic data at block 912. According to one embodiment, the data engine generates, based on the threshold value data, a thresholding operator for the captured seismic data. The thresholding operator may be applied to the envelope ratio scaling data to generate threshold envelope data, based on block 914.

Furthermore, the data engine may apply, at block 916, adaptive localized filtering to the threshold envelope data to generate coefficient data for the captured seismic data. Moreover, the data engine may estimate, based on the coefficient data for the captured seismic data, vertical component data for the second velocity data in the third data domain as indicated at block 918.

In some implementations, the data engine transforms, from the third data domain to the first data domain, the vertical component data and thereby generate temporal-spatial data associated with the first velocity data as shown at block 920. In addition, the data engine may generate, based on the temporal-spatial data, the noise component data comprised in the captured seismic data by subtracting the temporal-spatial data from the pressure data at block 922.

In one embodiment, the data engine may estimate, in a first iteration at block 924, the signal component data in the second data domain based on the noise component data, the pressure data, and the vertical component data and thereby generate an estimated signal component data. It is appreciated that the data engine may generate a multi-dimensional report indicating the estimated signal component data in the first domain at block 926. The multi-dimensional report can indicate the captured seismic data with one of: no data values corresponding to the noise component data; or substantially attenuated data values of the noise component data.

These and other implementations may each optionally include one or more of the following features.

In some embodiments, the noise component data comprises noise data including at least one of: random noise data; coherent noise data; or shear noise data resulting from propagation of shear waves in a subsurface of the resource site.

The first domain, according to some embodiments, comprises a 3-dimensional transform or a 5-dimensional transform. In addition, the first data domain can comprise a temporal spatial domain. Moreover, the second data domain can comprise a Fourier wavenumber domain. Furthermore, the third data domain can comprise a Curvelet domain.

According to some embodiments, estimating the signal component data in the second domain comprises applying a Bayesian weighting process using the noise component data, the pressure data, and the vertical component data and thereby generate the estimated signal component data.

In some implementations, scaling factor data is generated based on the estimated signal component data and the second pressure data. The scaling factor data can be applied to scale the second pressure data during a second iteration of generating the estimated signal component data.

It is appreciated that the resource site comprises an ocean bottom resource site.

It is further appreciated that the captured seismic data can be obtained using one or more of geophones, hydrophones, pressure sensors, signal acceleration sensors, or fiber optics sensors.

According to one embodiment, the report is used to create Green's function data characterizing a subsurface of the resource site. Furthermore, the report can be used for imaging or image inversion operations that characterize a subsurface at the resource site.

It is appreciated that the report can be used for at least one of: well placement operations at the resource site; equipment placement operations at the resource site; surgically locating a subsurface resource at the resource site; and configuring equipment associated with energy development at the resource site.

While any discussion of or citation to related art in this disclosure may or may not include some prior art references, Applicant neither concedes nor acquiesces to the position that any given reference is prior art or analogous prior art.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the invention and its practical applications, to thereby enable others skilled in the art to use the invention and various embodiments with various modifications as are suited to the particular use contemplated. It is appreciated that the term optimize/optimal and its variants (e.g., efficient or optimally) may simply indicate improving, rather than the ultimate form of 'perfection' or the like.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular embodiments and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

What is claimed is:

1. A method for removing noise component data comprised in seismic data, the method comprising:

receiving captured seismic data from one or more sensors deployed about a resource site, the captured seismic data including signal component data and the noise component data;

extracting, in a first data domain, velocity data and pressure data included in the captured seismic data and thereby generating first domain data including first pressure data and first velocity data in the first data domain, wherein the first data domain includes a 3-dimensional transform or a 5-dimensional transform, and wherein the first data domain includes a temporal spatial domain;

transforming, from the first data domain to a second data domain, the first velocity data and the first pressure data in the first data domain and thereby generating second domain data including second pressure data and second velocity data in the second data domain, wherein the second data domain includes a Fourier wavenumber domain, wherein transforming, from the first data domain to the second data domain, the first velocity data and the first pressure data comprises performing a Fourier transform along a spatial direction of the first data domain to generate common wavenumber gathers;

mapping wavenumber gather data associated with the second pressure data and the second velocity data from the second data domain to a third data domain, wherein the third data domain includes a Fourier-Curvelet domain, and wherein each common wavenumber gather of the Fourier wavenumber domain is mapped to a 2D Curvelet domain;

applying an enveloping function to the second pressure data and the second velocity data in the third data domain and thereby determining envelope ratio scaling data for the captured seismic data;

generating, based on noise variance of the second pressure data and the second velocity data, threshold value data for the captured seismic data;

generating, based on the threshold value data, a thresholding operator for the captured seismic data, wherein the thresholding operator is a stein thresholding operator, a soft thresholding operator, or a combination thereof, and the thresholding operator is applied to the envelope ratio scaling data to generate threshold envelope data;

applying adaptive localized filtering to the threshold envelope data to filter coefficient data from the threshold envelope data, wherein the adaptive localized filtering comprises a root-mean-square technique in the third data domain;

estimating, based on the coefficient data from the threshold envelope data and a weighted linear combination of the second pressure data and the second velocity data, vertical component data for the second velocity data in the third data domain;

transforming, from the third data domain to the first data domain, the vertical component data and thereby generating temporal-spatial data associated with the first velocity data;

generating, based on the temporal-spatial data, the noise component data included in the captured seismic data by subtracting the temporal-spatial data from the pressure data;

estimating, in a first iteration, the signal component data in the second data domain based on the noise component data, the pressure data, and the vertical component data and thereby generating an estimated signal component data; and generating a multi-dimensional report indicating the estimated signal component data in the first data domain, the multi-dimensional report indicating the captured seismic data with one of:

no data values corresponding to the noise component data, or substantially attenuated data values of the noise component data.

2. The method of claim 1, wherein the noise component data includes noise data including at least one of:

random noise data;

coherent noise data; or shear noise data resulting from propagation of shear waves in a subsurface of the resource site.

3. The method of claim 1, wherein estimating the signal component data in the second data domain includes applying a Bayesian weighting process using the noise component data, the pressure data, and the vertical component data and thereby generating the estimated signal component data.

4. The method of claim 1, wherein scaling factor data is generated based on the estimated signal component data and the second pressure data, the scaling factor data being applied to scale the second pressure data during a second iteration of generating the estimated signal component data.

5. The method of claim 1, wherein the resource site includes one of an ocean bottom resource site or a land-based resource site.

6. The method of claim 1, wherein the captured seismic data is obtained using one or more of geophones, hydrophones, pressure sensors, signal acceleration sensors, or fiber optics sensors.

7. The method of claim 1, wherein the report is used to create Green's function data characterizing a subsurface of the resource site.

8. The method of claim 1, wherein the report is used for imaging or image inversion operations that characterize a subsurface at the resource site.

9. The method of claim 1, wherein the report is used for at least one of:

well placement operations at the resource site;

equipment placement operations at the resource site;

surgically locating a subsurface resource at the resource site; or configuring equipment associated with energy development at the resource site.

10. A system for removing noise component data comprised in seismic data, the system comprising:

a computer processor; and a memory storing a data processing engine that includes instructions which are executable by the computer processor to:

receive captured seismic data from one or more sensors deployed about a resource site, the captured seismic data including signal component data and the noise component data;

extract, in a first data domain, velocity data and pressure data included in the captured seismic data and thereby generate first domain data including first pressure data and first velocity data in the first data domain, wherein the first data domain includes a 3-dimensional transform or a 5-dimensional transform, and wherein the first data domain includes a temporal spatial domain;

transform, from the first data domain to a second data domain, the first velocity data and the first pressure data in the first data domain and thereby generate second domain data including second pressure data and second velocity data in the second data domain, wherein the second data domain includes a Fourier wavenumber domain, wherein transforming, from the first data domain to the second data domain, the first velocity data and the first pressure data comprises performing a Fourier transform along a spatial direction of the first data domain to generate common wavenumber gathers;

map wavenumber gather data associated with the second pressure data and the second velocity data from the second data domain to a third data domain, wherein the third data domain includes a Fourier-Curvelet domain, and wherein each common wavenumber gather of the Fourier wavenumber domain is mapped to a 2D Curvelet domain;

apply an enveloping function to the second pressure data and the second velocity data in the third data domain and thereby determine envelope ratio scaling data for the captured seismic data;

generate, based on noise variance of the second pressure data and the second velocity data, threshold value data for the captured seismic data;

generate, based on the threshold value data, a thresholding operator for the captured seismic data, wherein the thresholding operator is a stein thresholding operator, a soft thresholding operator, or a combination thereof, and the thresholding operator is applied to the envelope ratio scaling data to generate threshold envelope data;

apply adaptive localized filtering to the threshold envelope data to generate filter coefficient data from the threshold envelope data for the captured seismic data, wherein the adaptive localized filtering comprises a root-mean-square technique in the third data domain;

estimate, based on the coefficient data from the threshold envelope data and a weighted linear combination of the second pressure data and the second velocity data for the captured seismic data, vertical component data for the second velocity data in the third data domain;

transform, from the third data domain to the first data domain, the vertical component data and thereby generate temporal-spatial data associated with the first velocity data;

generate, based on the temporal-spatial data, the noise component data included in the captured seismic data by subtracting the temporal-spatial data from the pressure data;

estimate, in a first iteration, the signal component data in the second data domain based on the noise component data, the pressure data, and the vertical component data and thereby generate an estimated signal component data; and generate a multi-dimensional report indicating the estimated signal component data in the first data domain, the multi-dimensional report indicating the captured seismic data with one of:

no data values corresponding to the noise component data, or substantially attenuated data values of the noise component data.

11. The system of claim 10, wherein the noise component data includes shear noise resulting from propagation of shear waves in a subsurface of the resource site.

12. The system of claim 10, wherein estimating the signal component data in the second data domain includes applying a Bayesian weighting process using the noise component data, the pressure data, and the vertical component data and thereby generating the estimated signal component data.

13. The system of claim 10, wherein the resource site includes one of an ocean bottom resource site or a land-based resource site.

14. The system of claim 10, wherein the report is used to create Green's function data characterizing a subsurface of the resource site.

15. The system of claim 10, wherein the report is used for imaging or image inversion operations that characterize a subsurface at the resource site.

16. The system of claim 10, wherein the report is used for at least one of:

well placement operations at the resource site;

equipment placement operations at the resource site;

surgically locating a subsurface resource at the resource site; or configuring equipment associated with energy development at the resource site.

17. A computer program for removing noise component data comprised in seismic data, the computer program including a non-transitory computer-readable medium comprising code configured to:

receive captured seismic data from one or more sensors deployed about a resource site, the captured seismic data including signal component data and the noise component data;

extract, in a first data domain, velocity data and pressure data included in the captured seismic data and thereby generate first domain data including first pressure data and first velocity data in the first data domain, wherein the first data domain includes a 3-dimensional transform or a 5-dimensional transform, and wherein the first data domain includes a temporal spatial domain;

transform, from the first data domain to a second data domain, the first velocity data and the first pressure data in the first data domain and thereby generate second domain data including second pressure data and second velocity data in the second data domain, wherein the second data domain includes a Fourier wavenumber domain, wherein transforming, from the first data domain to the second data domain, the first velocity data and the first pressure data comprises performing a Fourier transform along a spatial direction of the first data domain to generate common wavenumber gathers;

map wavenumber gather data associated with the second pressure data and the second velocity data from the second data domain to a third data domain, wherein the third data domain includes a Fourier-Curvelet domain, and wherein each common wavenumber gather of the Fourier wavenumber domain is mapped to a 2D Curvelet domain;

apply an enveloping function to the second pressure data and the second velocity data in the third data domain and thereby determine envelope ratio scaling data for the captured seismic data;

generate, based on noise variance of the second pressure data and the second velocity data, threshold value data for the captured seismic data;

generate, based on the threshold value data, a thresholding operator for the captured seismic data, wherein the thresholding operator is a stein thresholding operator, a soft thresholding operator, or a combination thereof, and the thresholding operator is applied to the envelope ratio scaling data to generate threshold envelope data;

apply adaptive localized filtering to the threshold envelope data to generate filter coefficient data from the threshold envelope data for the captured seismic data;

estimate, based on the coefficient data from the threshold envelope data and a weighted linear combination of the second pressure data and the second velocity data for the captured seismic data, vertical component data for the second velocity data in the third data domain;

transform, from the third data domain to the first data domain, the vertical component data and thereby generate temporal-spatial data associated with the first velocity data;

generate, based on the temporal-spatial data, the noise component data included in the captured seismic data by subtracting the temporal-spatial data from the pressure data;

estimate, in a first iteration, the signal component data in the second data domain based on the noise component data, the pressure data, and the vertical component data and thereby generate an estimated signal component data; and generate a multi-dimensional report indicating the estimated signal component data in the first data domain, the multi-dimensional report indicating the captured seismic data with one of:

no data values corresponding to the noise component data, or substantially attenuated data values of the noise component data.

* * * * *